(12) United States Patent  
Liao et al.

(10) Patent No.: US 12,273,552 B2  
(45) Date of Patent: *Apr. 8, 2025

(54) METHOD AND APPARATUS FOR ENCODING OR DECODING VIDEO

(71) Applicant: ALIBABA GROUP HOLDING LIMITED, Grand Cayman (KY)

(72) Inventors: Ru-Ling Liao, Beijing (CN); Jie Chen, Beijing (CN); Yan Ye, San Diego, CA (US)

(73) Assignee: Alibaba Group Holding Limited, Grand Cayman (KY)

(*) Notice: Subject to any disclaimer, the term of this patent is extended or adjusted under 35 U.S.C. 154(b) by 4 days.

This patent is subject to a terminal disclaimer.

(21) Appl. No.: 18/327,483

(22) Filed: Jun. 1, 2023

(65) Prior Publication Data  
US 2023/0319303 A1 Oct. 5, 2023

Related U.S. Application Data

(63) Continuation of application No. 17/203,004, filed on Mar. 16, 2021, now Pat. No. 11,706,439.  
(Continued)

(51) Int. Cl.  
*H04N 19/513* (2014.01)  
*H04N 19/105* (2014.01)  
(Continued)

(52) U.S. Cl.  
CPC ......... *H04N 19/513* (2014.11); *H04N 19/105* (2014.11); *H04N 19/159* (2014.11); *H04N 19/176* (2014.11)

(58) Field of Classification Search  
CPC .................................................. H04N 19/513  
See application file for complete search history.

(56) References Cited

U.S. PATENT DOCUMENTS

2005/0117646 A1 6/2005 Joch et al.  
2012/0082210 A1* 4/2012 Chien .................. H04N 19/428  
375/240.12  
(Continued)

FOREIGN PATENT DOCUMENTS

CN 105120292 A 12/2015  
CN 112055203 A * 12/2020 ........... H04N 19/103  
(Continued)

OTHER PUBLICATIONS

Call for New generation AVS3 video coding proposals, AVS-N2509, Dec. 2017, 4 pages.  
(Continued)

*Primary Examiner* — Irfan Habib  
(74) *Attorney, Agent, or Firm* — Finnegan, Henderson, Farabow, Garrett & Dunner, LLP

(57) ABSTRACT

The present disclosure provides a computer-implemented method for decoding video. The method includes receiving a bitstream including a coding unit of a video frame, the coding unit being coded in a skip mode or a direct mode; determining whether the coding units has a width greater than a threshold width or a height greater than a threshold height; in response to the coding unit having the width greater than the threshold width or the height greater than the threshold height, enabling a motion vector angular prediction process to store one or more motion vector angular prediction candidates in a candidate list storing a plurality of motion candidates associated with the coding unit; and performing an inter prediction to the coding unit according to the candidate list and an index parsed from the bitstream.

22 Claims, 14 Drawing Sheets

Related U.S. Application Data

(60) Provisional application No. 63/000,095, filed on Mar. 26, 2020.

(51) Int. Cl.
   H04N 19/159 (2014.01)
   H04N 19/176 (2014.01)

(56) References Cited

U.S. PATENT DOCUMENTS

| | | | |
|---|---|---|---|
| 2014/0056352 A1 | 2/2014 | Park et al. | |
| 2014/0355679 A1 | 12/2014 | Rosewarne | |
| 2016/0100186 A1 | 4/2016 | Gisquet et al. | |
| 2018/0288408 A1* | 10/2018 | Ikai | H04N 19/105 |
| 2020/0036997 A1 | 1/2020 | Li et al. | |
| 2020/0053359 A1 | 2/2020 | Lee et al. | |
| 2020/0099924 A1* | 3/2020 | Seregin | H04N 19/134 |
| 2020/0120339 A1* | 4/2020 | Chiang | H04N 19/105 |
| 2020/0275096 A1* | 8/2020 | Rath | H04N 19/159 |
| 2020/0359033 A1* | 11/2020 | Ramasubramonian | H04N 19/91 |
| 2021/0092439 A1* | 3/2021 | Ikai | H04N 19/105 |
| 2021/0144400 A1* | 5/2021 | Liu | H04N 19/70 |
| 2021/0211708 A1* | 7/2021 | Lee | H04N 19/122 |
| 2021/0266539 A1* | 8/2021 | Lee | H04N 19/132 |
| 2021/0281870 A1* | 9/2021 | Solovyev | H04N 19/132 |
| 2021/0400298 A1* | 12/2021 | Zhao | H04N 19/513 |
| 2022/0094930 A1* | 3/2022 | Zhang | H04N 19/132 |
| 2022/0116587 A1* | 4/2022 | Zhao | H04N 19/52 |
| 2022/0116656 A1* | 4/2022 | Vanam | H04N 19/11 |
| 2022/0124310 A1* | 4/2022 | Kang | H04N 19/52 |
| 2022/0182665 A1* | 6/2022 | Li | H04N 19/132 |
| 2022/0182667 A1* | 6/2022 | Li | H04N 19/105 |
| 2022/0248025 A1* | 8/2022 | Deng | H04N 19/132 |

FOREIGN PATENT DOCUMENTS

| | | |
|---|---|---|
| JP | 2015211386 A | 11/2015 |
| WO | 2015006884 A1 | 1/2015 |

OTHER PUBLICATIONS

Fang S., HPM, ftp://47—93.196_12 Public/codec/video_codec/ HPM, Aug. 23, 2019, 7 pages.

Liang F., "AVS3-P2(CD4.0)", AVS-N2724, Aug. 2019, 228 pages.

PCT International Search Report and Written Opinion mailed Jul. 28, 2021, issued in corresponding International Application No. PCT/US2021/022521 (10 pgs.).

Kudo et al., "Motion Vector Prediction Methods Considering Prediction Continuity in HEVC," 2016 Picture Coding Symposium (PCS), IEEE 2016, 5 pages.

Chinese Search Report issued in corresponding Chinese Application No. 202180020442.0 (2 pages), Jul. 13, 2023.

Kim et al., "JVET-N0216 Non-CE3: Determination of wide-angle mode using the size of a coding block," Wilus Inc., 5 pages, Mar. 2019.

\* cited by examiner

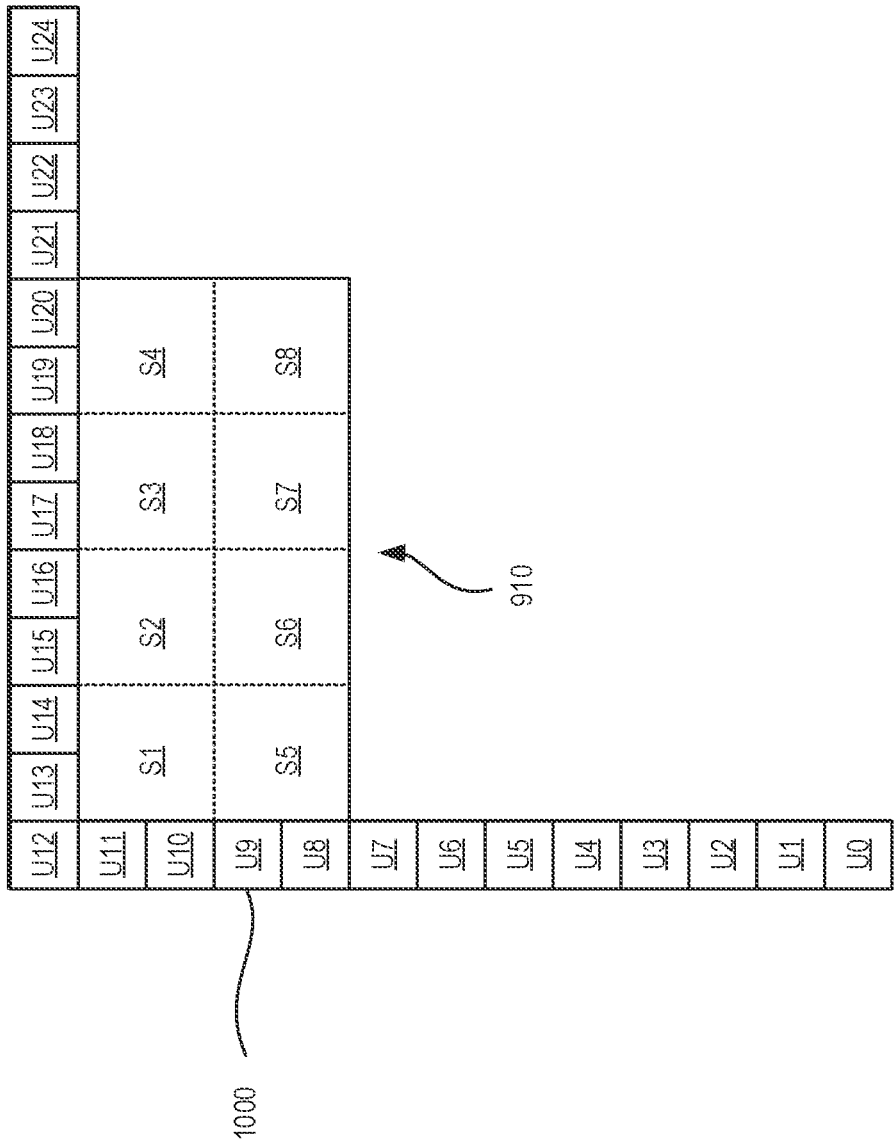

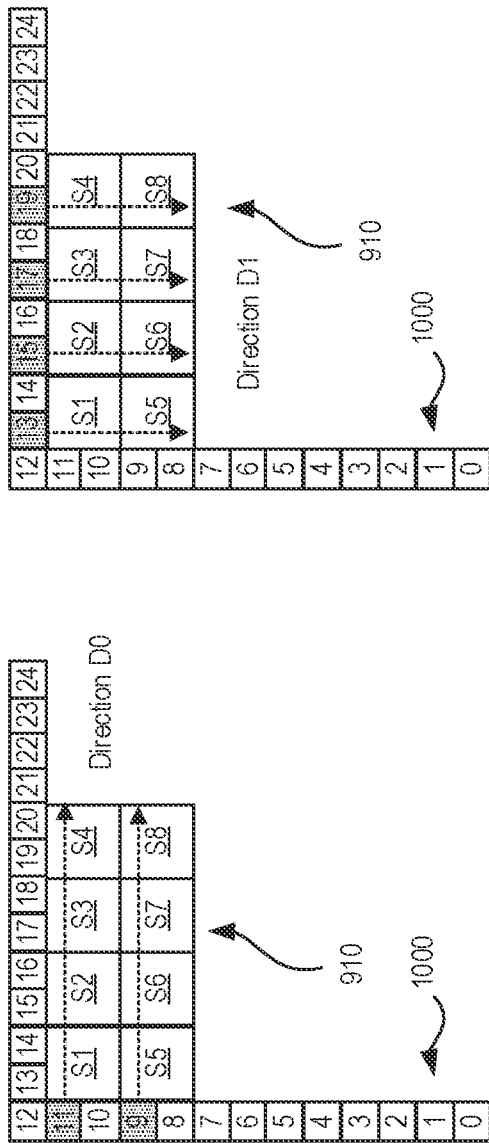
FIG. 12A
FIG. 12B
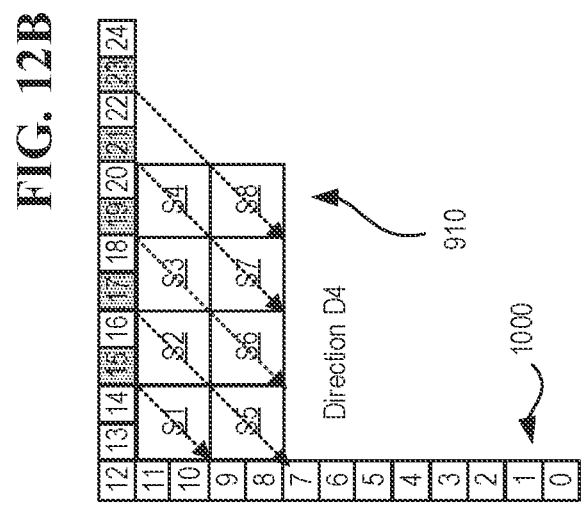
FIG. 12D
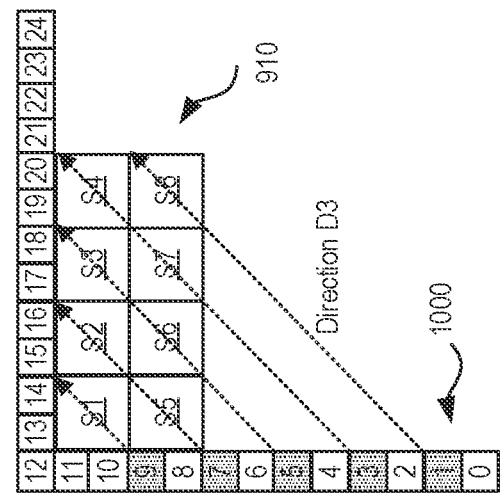
FIG. 12E
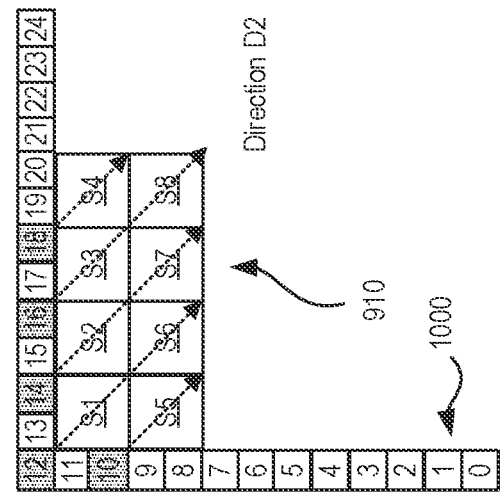
FIG. 12C

METHOD AND APPARATUS FOR ENCODING OR DECODING VIDEO

CROSS-REFERENCE TO RELATED APPLICATIONS

This application is a continuation of application Ser. No. 17/203,004, filed Mar. 16, 2021, which is based upon and claims priority to U.S. Provisional Patent Application No. 63/000,095, filed Mar. 26, 2020, both of which are incorporated herein by reference in their entireties.

TECHNICAL FIELD

The present disclosure generally relates to video data processing, and more particularly, to the use of motion vector angular prediction.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (e.g., HEVC/H.265) standard, the Versatile Video Coding (e.g., VVC/H.266) standard, and Audio Video Coding Standard (AVS) standards, specifying the specific video coding formats, are developed by standardization organizations. With more and more advanced video coding technologies being adopted in the video standards, the coding efficiency of the new video coding standards get higher and higher.

SUMMARY OF THE PRESENT DISCLOSURE

In some exemplary embodiments, a computer-implemented method for decoding video is provided. The method includes: receiving a bitstream including a coding unit of a video frame, the coding unit being coded in a skip mode or a direct mode; determining whether the coding unit has a width greater than a threshold width or a height greater than a threshold height; in response to the coding unit having the width greater than the threshold width or the height greater than the threshold height, enabling a motion vector angular prediction process to store one or more motion vector angular prediction candidates in a candidate list storing a plurality of motion candidates associated with the coding unit; and performing an inter prediction to the coding unit according to the candidate list and an index parsed from the bitstream.

Embodiments of the present disclosure provide an apparatus. In some embodiments, the apparatus includes a memory configured to store instructions; and a processor coupled to the memory and configured to execute the instructions to cause the apparatus to: receive a bitstream including a coding unit of a video frame, the coding unit being coded in a skip mode or a direct mode; determine whether the coding unit has a width greater than a threshold width or a height greater than a threshold height; in response to the coding unit having the width greater than the threshold width or the height greater than the threshold height, enable a motion vector angular prediction process to store one or more motion vector angular prediction candidates in a candidate list storing a plurality of motion candidates associated with the coding unit; and perform an inter prediction to the coding unit according to the candidate list and an index parsed from the bitstream.

Embodiments of the present disclosure provide a non-transitory computer-readable storage medium storing a set of instructions that are executable by one or more processors of a device to cause the device to perform a method for motion vector prediction. The method includes: dividing a coding unit into a plurality of subblocks; filling a reference list associated with the coding unit by: filling a reference unit in the reference list with motion information of a neighboring block of the coding unit, if the motion information of the neighboring block associated with the reference unit is available; filling a first reference unit being a first entry in the reference list with a predefined motion information if the motion information of a first neighboring block associated with the first reference unit is unavailable; and filling a remaining reference unit with the motion information filled in a previous neighboring reference unit in the reference list if the motion information of the neighboring block associated with the remaining reference unit is unavailable; and performing a motion vector angular prediction process to obtain one or more motion vector angular prediction candidates for each subblock by using the reference list according to one or more prediction directions.

BRIEF DESCRIPTION OF THE DRAWINGS

Embodiments and various aspects of present disclosure are illustrated in the following detailed description and the accompanying figures. Various features shown in the figures are not drawn to scale.

FIG. 10 illustrates an exemplary reference motion information list for use in the MVAP process, consistent with some embodiments of the present disclosure.

FIG. 12A illustrates an exemplary MVAP candidate at a first direction for each subblock, consistent with some embodiments of the present disclosure.

FIG. 12B illustrates an exemplary MVAP candidate at a second direction for each subblock, consistent with some embodiments of the present disclosure.

FIG. 12C illustrates an exemplary MVAP candidate at a third direction for each subblock, consistent with some embodiments of the present disclosure.

FIG. 12D illustrates an exemplary MVAP candidate at a fourth direction for each subblock, consistent with some embodiments of the present disclosure.

FIG. 12E illustrates an exemplary MVAP candidate at a fifth direction for each subblock, consistent with some embodiments of the present disclosure.

DETAILED DESCRIPTION

Figure 1:
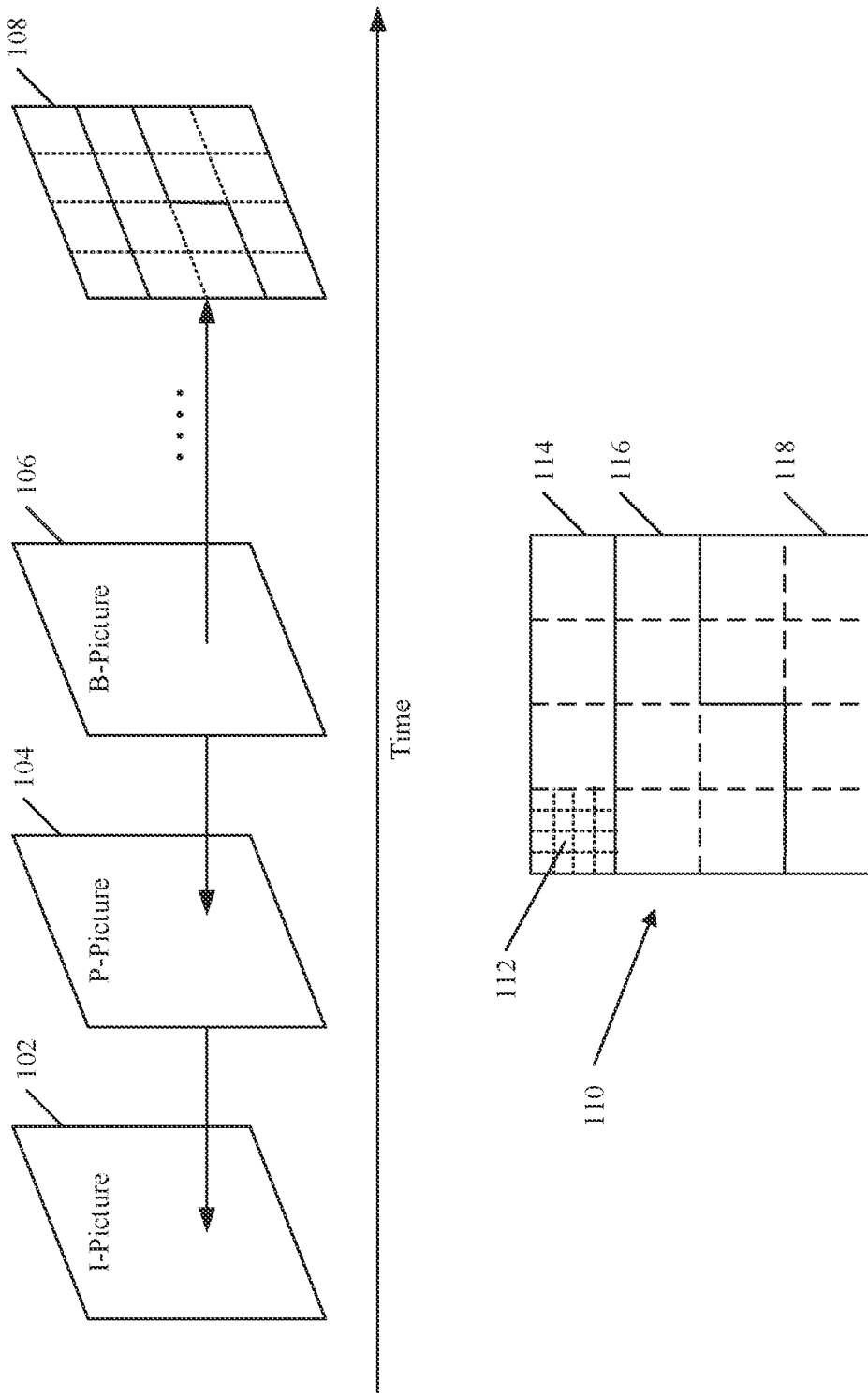
FIG. 1 illustrates structures of an exemplary video sequence, consistent with some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims. Particular aspects of present disclosure are described in greater detail below. The terms and definitions provided herein control, if in conflict with terms or definitions incorporated by reference.

Audio Video Coding Standard (AVS) Workgroup is a standard setting organization for the AVS family of video standards. AVS Workgroup is developing the AVS3 video standard, the third generation of the AVS family of video standards. The predecessor of AVS3, AVS1 and AVS2, were issued in 2006 and 2016, respectively. AVS3 standard is based on the same hybrid video coding system that has been used in modern video compression standards such as AVS1, AVS2, H.264/AVC, H.265/HEVC, etc.

High Performance Model (HPM) was chosen by the AVS Workgroup as a new reference software platform for AVS3 standard development. The initial technologies in the HPM were inherited from the AVS2 standard, which were then modified and augmented with new advanced video coding technologies to improve the compression performance. The coding performance of the finalized first phase of AVS3 was improved by over 20%, compared with its predecessor AVS2. AVS is continuing to include coding technologies that improve compression performance, and the second phase of AVS3 standard is being developed on top of the first phase of AVS3 to improve the coding efficiency.

A video is a set of static pictures (or frames) arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

To reduce the storage space and the transmission bandwidth needed by such applications, the video can be compressed. For example, the video can be compressed before storage and transmission and decompressed before the display. The compression and decompression can be implemented by software executed by a processor (e.g., a processor of a generic computer) or specialized hardware. The module or circuitry for compression is generally referred to as an "encoder," and the module or circuitry for decompression is generally referred to as a "decoder." The encoder and the decoder can be collectively referred to as a "codec." The encoder and the decoder can be implemented as any of a variety of suitable hardware, software, or a combination thereof. For example, the hardware implementation of the encoder and the decoder can include circuitry, such as one or more microprocessors, digital signal processors ("DSPs"), application-specific integrated circuits ("ASICs"), field-programmable gate arrays ("FPGAs"), discrete logic, or any combinations thereof. The software implementation of the encoder and the decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, AVS standard, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture. If information that was disregarded in the video encoding process cannot be fully reconstructed, the encoding process can be referred to as "lossy." Otherwise, it can be referred to as "lossless." Most encoding processes are lossy, which is a tradeoff to reduce the needed storage space and the transmission bandwidth.

In many cases, the useful information of a picture being encoded (referred to as a "current picture") can include changes with respect to a reference picture (e.g., a picture previously encoded or reconstructed). Such changes can include position changes, luminosity changes, or color changes of the pixels. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

In the present disclosure, a simplified motion vector angular prediction (MVAP) process can be applied for the encoder and the decoder in a skip mode or a direct mode coding by selectively enabling or disabling the MVAP process according to the size of the coding unit and assigning a predefined motion information when the first entry in the reference list is unavailable in the MVAP process. This modification can improve the coding performance by disabling less useful coding tool(s) for the current coding unit during the encoding and decoding process for the video stream, and achieve a hardware-friendly approach for the skip mode or the direct mode coding at both the encoder side and the decoder side.

FIG. 1 illustrates structures of an exemplary video sequence, consistent with some embodiments of the present disclosure. Video sequence 100 can be a live video or a video having been captured and archived. Video sequence 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider. As shown in FIG. 1, video sequence 100 can include a series of pictures arranged temporally along a timeline, including pictures 102, 104, 106, and 108. Pictures 102-106 are continuous, and there are more pictures between pictures 106 and 108.

When a video is being compressed or decompressed, useful information of a picture being encoded (referred to as a "current picture") include changes with respect to a reference picture (e.g., a picture previously encoded and reconstructed). Such changes can include position changes, luminosity changes, or color changes of the pixels. For example, position changes of a group of pixels can reflect the motion of an object represented by these pixels between two pictures (e.g., the reference picture and the current picture).

For example, as shown in FIG. 1, picture 102 is an I-picture, using itself as the reference picture. Picture 104 is a P-picture, using picture 102 as its reference picture, as indicated by the arrow. Picture 106 is a B-picture, using pictures 104 and 108 as its reference pictures, as indicated by the arrows. In some embodiments, the reference picture of a picture may be or may be not immediately preceding or following the picture. For example, the reference picture of picture 104 can be a picture preceding picture 102, i.e., a picture not immediately preceding picture 104. The above-described reference pictures of pictures 102-106 shown in FIG. 1 are merely examples, and not meant to limit the present disclosure.

Due to the computing complexity, in some embodiments, video codecs can split a picture into multiple basic segments and encode or decode the picture segment by segment. That is, video codecs do not necessarily encode or decode an entire picture at one time. Such basic segments are referred to as basic processing units ("BPUs") in the present disclosure. For example, FIG. 1 also shows an exemplary structure 110 of a picture of video sequence 100 (e.g., any of pictures 102-108). For example, structure 110 may be used to divide picture 108. As shown in FIG. 1, picture 108 is divided into 4×4 basic processing units. In some embodiments, the basic processing units can be referred to as "coding tree units" ("CTUs") in some video coding standards (e.g., AVS3, H.265/HEVC or H.266/VVC), or as "macroblocks" in some video coding standards (e.g., MPEG family, H.261, H.263, or H.264/AVC). In AVS3, a CTU can be the largest block unit, and can be as large as 128×128 luma samples (plus the corresponding chroma samples depending on the chroma format).

The basic processing units in FIG. 1 is for illustrative purpose only. The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards. Operations performed to a basic processing unit can be repeatedly performed to its luma and chroma components.

During multiple stages of operations in video coding, the size of the basic processing units may still be too large for processing, and thus can be further partitioned into segments referred to as "basic processing sub-units" in the present disclosure. For example, at a mode decision stage, the encoder can split the basic processing unit into multiple basic processing sub-units, and decide a prediction type for each individual basic processing sub-unit. As shown in FIG. 1, basic processing unit 112 in structure 110 is further partitioned into 4×4 basic processing sub-units. For example, in AVS3, a CTU may be further partitioned into coding units (CUs) using quad-tree, binary tree, or extended binary tree. The basic processing sub-units in FIG. 1 is for illustrative purpose only. Different basic processing units of the same picture can be partitioned into basic processing sub-units in different schemes. The basic processing sub-units can be referred to as "coding units" ("CUs") in some video coding standards (e.g., AVS3, H.265/HEVC or H.266/VVC), or as "blocks" in some video coding standards (e.g., MPEG family, H.261, H.263, or H.264/AVC). The size of a basic processing sub-unit can be the same or smaller than the size of a basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Operations performed to a basic processing sub-unit can be repeatedly performed to its luma and chroma components. Such division can be performed to further levels depending on processing needs, and in different stages, the basic processing units can be partitioned using different schemes. At the leaf nodes of the partitioning structure, coding information such as coding mode (e.g., intra prediction mode or inter prediction mode), motion information (e.g., reference index, motion vectors (MVs), etc.) required for corresponding coding mode, and quantized residual coefficients are sent.

In some cases, a basic processing sub-unit can still be too large to process in some stages of operations in video coding, such as a prediction stage or a transform stage.

Accordingly, the encoder can further split the basic processing sub-unit into smaller segments (e.g., referred to as "prediction blocks" or "PBs"), at the level of which a prediction operation can be performed. Similarly, the encoder can further split the basic processing sub-unit into smaller segments (e.g., referred to as "transform blocks" or "TBs"), at the level of which a transform operation can be performed. The division schemes of the same basic processing sub-unit can be different at the prediction stage and the transform stage. For example, the prediction blocks (PBs) and transform blocks (TBs) of the same CU can have different sizes and numbers. Operations in the mode decision stage, the prediction stage, the transform stage will be detailed in later paragraphs with examples provided in FIG. 2 and FIG. 3.

In some implementations, to provide the capability of parallel processing and error resilience to video encoding and decoding, a picture can be divided into regions for processing, such that, for a region of the picture, the encoding or decoding process can depend on no information from any other region of the picture. In other words, regions of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, two types of regions: "slices" and "tiles" are provided in some standards. Different pictures of video sequence 100 can also have different partition schemes for dividing a picture into regions.

In some standards, two modes of slices are supported. In a raster-scan slice mode, a slice includes a sequence of tiles in a tile raster scan of a picture. In a rectangular slice mode, a slice includes one or more tiles that collectively form a rectangular region of the picture, or one or more consecutive CTU rows of one tile that collectively form a rectangular region of the picture. Tiles within a rectangular slice can be scanned in tile raster scan order within the rectangular region corresponding to that slice. For example, in FIG. 1, structure 110 is divided into 16 tiles (4 tile columns and 4 tile rows) and 3 raster-scan slices 114, 116, and 118, where the boundaries of which are shown as solid lines inside structure 110. Slice 114 includes four basic processing units. Slices 116 and 118 respectively include six basic processing units. In some embodiments, a subpicture may include one or more slices that collectively cover a rectangular region of the picture. It should be noted that the basic processing units, basic processing sub-units, and tiles and slices of structure 110 in FIG. 1 are only examples, and not meant to limit the present disclosure.

Figure 2:
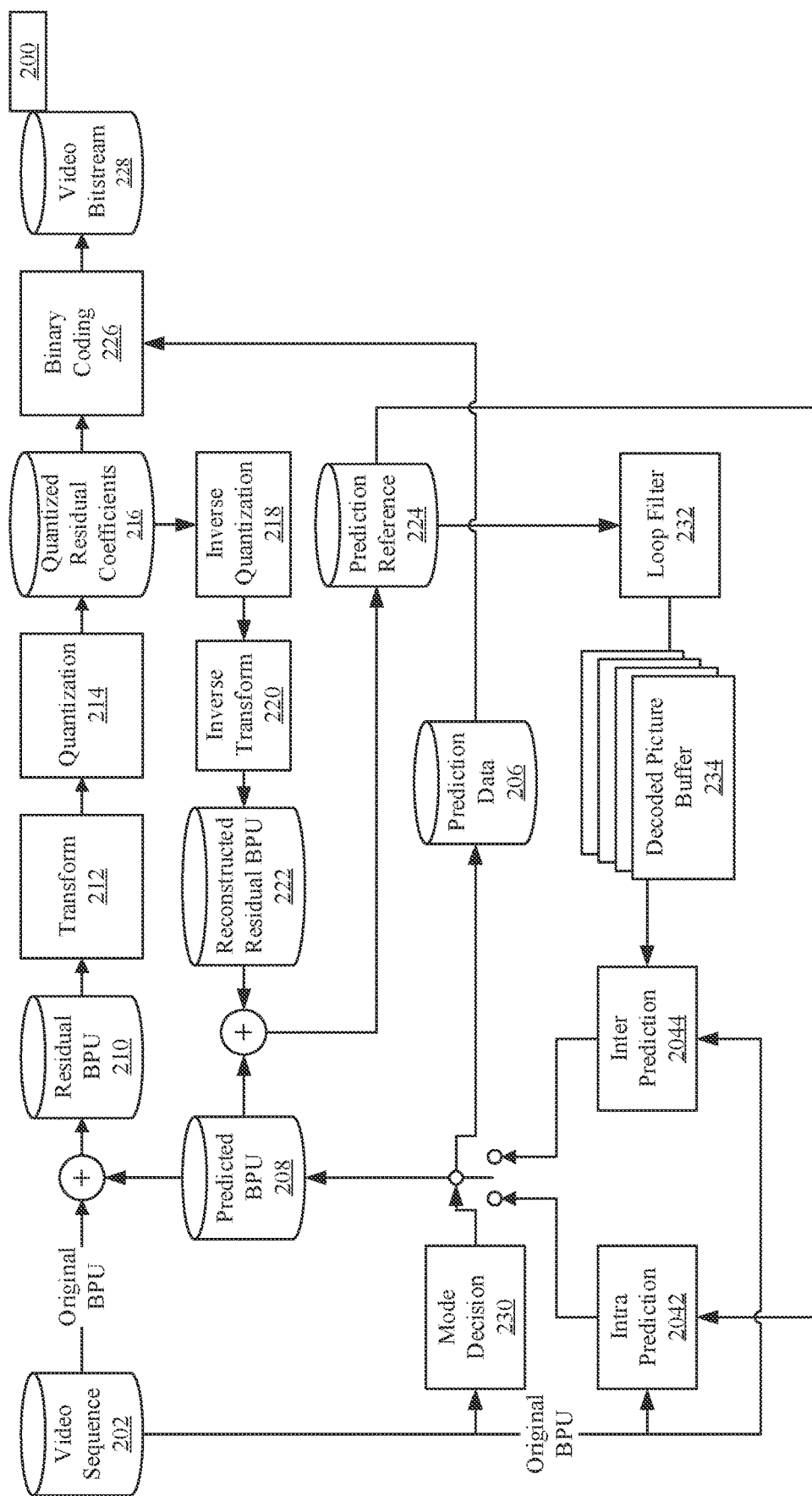
FIG. 2 illustrates a schematic diagram of an exemplary encoder in a video coding system, consistent with some embodiments of the present disclosure.

FIG. 2 illustrates a schematic diagram of an exemplary encoder 200 in a video coding system, (e.g., AVS3 or H.26x series), consistent with some embodiments of the present disclosure. The input video is processed block by block. As discussed above, in the AVS3 standard, a CTU is the largest block unit and can be as large as 128×128 luma samples (plus the corresponding chroma samples depending on the chroma format). One CTU may be further partitioned into CUs using quad-tree, binary tree, or ternary tree. Referring to FIG. 2, encoder 200 can receive video sequence 202 generated by a video capturing device (e.g., a camera). The term "receive" used herein can refer to receiving, inputting, acquiring, retrieving, obtaining, reading, accessing, or any action in any manner for inputting data. Encoder 200 can encode video sequence 202 into video bitstream 228. Similar to video sequence 100 in FIG. 1, video sequence 202 can include a set of pictures (referred to as "original pictures") arranged in a temporal order. Similar to structure 110 in FIG. 1, any original picture of video sequence 202 can be divided by encoder 200 into basic processing units, basic processing sub-units, or regions for processing. In some embodiments, encoder 200 can perform process at the level of basic processing units for original pictures of video sequence 202. For example, encoder 200 can perform process in FIG. 2 in an iterative manner, in which encoder 200 can encode a basic processing unit in one iteration of process. In some embodiments, encoder 200 can perform process in parallel for regions (e.g., slices 114-118 in FIG. 1) of original pictures of video sequence 202.

Components 202, 2042, 2044, 206, 208, 210, 212, 214, 216, 226, and 228 can be referred to as a "forward path." In FIG. 2, encoder 200 can feed a basic processing unit (referred to as an "original BPU") of an original picture of video sequence 202 to two prediction stages, intra prediction (also known as an "intra-picture prediction" or "spatial prediction") stage 2042 and inter prediction (also known as an "inter-picture prediction," "motion compensated prediction," or "temporal prediction") stage 2044 to perform a prediction operation and generate corresponding prediction data 206 and predicted BPU 208. Particularly, encoder 200 can receive the original BPU and prediction reference 224, which can be generated from the reconstruction path of the previous iteration of process.

The purpose of intra prediction stage 2042 and inter prediction stage 2044 is to reduce information redundancy by extracting prediction data 206 that can be used to reconstruct the original BPU as predicted BPU 208 from prediction data 206 and prediction reference 224. In some embodiments, an intra prediction can use pixels from one or more already coded neighboring BPUs in the same picture to predict the current BPU. That is, prediction reference 224 in the intra prediction can include the neighboring BPUs, so that spatial neighboring samples can be used to predict the current block. The intra prediction can reduce the inherent spatial redundancy of the picture.

In some embodiments, an inter prediction can use regions from one or more already coded pictures ("reference pictures") to predict the current BPU. That is, prediction reference 224 in the inter prediction can include the coded pictures. The inter prediction can reduce the inherent temporal redundancy of the pictures.

In the forward path, encoder 200 performs the prediction operation at intra prediction stage 2042 and inter prediction stage 2044. For example, at intra prediction stage 2042, encoder 200 can perform the intra prediction. For an original BPU of a picture being encoded, prediction reference 224 can include one or more neighboring BPUs that have been encoded (in the forward path) and reconstructed (in the reconstructed path) in the same picture. Encoder 200 can generate predicted BPU 208 by extrapolating the neighboring BPUs. The extrapolation technique can include, for example, a linear extrapolation or interpolation, a polynomial extrapolation or interpolation, or the like. In some embodiments, encoder 200 can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at inter prediction stage 2042, encoder 200 can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, encoder 200 can add reconstructed residual BPU 222 to predicted BPU 208 to generate a reconstructed BPU. When all reconstructed BPUs of the same picture are generated, encoder 200 can generate a reconstructed picture as a reference picture. Encoder 200 can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When encoder 200 identifies (e.g., by using a pel-recursive algorithm, a block-matching algorithm, or the like) a region similar to the original BPU in the search window, encoder 200 can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. Encoder 200 can record the direction and distance of such a motion as a "motion vector (MV)." When multiple reference pictures are used (e.g., as picture 106 in FIG. 1), encoder 200 can search for a matching region and determine its associated MV for each reference picture. In some embodiments, encoder 200 can assign weights to pixel values of the matching regions of respective matching reference pictures.

The motion estimation can be used to identify various types of motions, such as, for example, translations, rotations, zooming, or the like. For inter prediction, prediction data 206 can include, for example, reference index, locations (e.g., coordinates) of the matching region, MVs associated with the matching region, number of reference pictures, weights associated with the reference pictures, or other motion information.

For generating predicted BPU 208, encoder 200 can perform an operation of "motion compensation." The motion compensation can be used to reconstruct predicted BPU 208 based on prediction data 206 (e.g., the MV) and prediction reference 224. For example, encoder 200 can move the matching region of the reference picture according to the MV, in which encoder 200 can predict the original BPU of the current picture. When multiple reference pictures are used (e.g., as picture 106 in FIG. 1), encoder 200 can move the matching regions of the reference pictures according to the respective MVs and average pixel values of the matching regions. In some embodiments, if encoder 200 has assigned weights to pixel values of the matching regions of respective matching reference pictures, encoder 200 can add a weighted sum of the pixel values of the moved matching regions.

In some embodiments, the inter prediction can utilize uni-prediction or bi-prediction and be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. In uni-prediction, only one MV pointing to one reference picture is used to generate the prediction signal for the current block.

On the other hand, bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at opposite temporal directions with respect to picture 104. In bi-prediction, two MVs, each pointing to its own reference picture, are used to generate the prediction signal of the current block. After video bitstream 228 is generated, MVs and reference indices can be sent in video bitstream 228 to a decoder, to identify where the prediction signal(s) of the current block come from.

For inter-predicted CUs, motion parameters may include MVs, reference picture indices and reference picture list usage index, or other additional information needed for coding features to be used. Motion parameters can be signaled in an explicit or implicit manner. In AVS3, under some specific inter coding modes, such as a skip mode or a direct mode, motion parameters (e.g., MV delta and reference picture index) are not coded and signaled in video bitstream 228. Instead, the motion parameters can be derived at the decoder side with the same rule as defined in encoder 200. Details of the skip mode and the direct mode will be discussed in the paragraphs below.

After intra prediction stage 2042 and inter prediction stage 2044, at mode decision stage 230, encoder 200 can select a prediction mode (e.g., one of the intra prediction or the inter prediction) for the current iteration of process. For example, encoder 200 can perform a rate-distortion optimization method, in which encoder 200 can select a prediction mode to minimize a value of a cost function depending on a bit rate of a candidate prediction mode and distortion of the reconstructed reference picture under the candidate prediction mode. Depending on the selected prediction mode, encoder 200 can generate the corresponding predicted BPU 208 (e.g., a prediction block) and prediction data 206.

In some embodiments, predicted BPU 208 can be identical to the original BPU. However, due to non-ideal prediction and reconstruction operations, predicted BPU 208 is generally slightly different from the original BPU. For recording such differences, after generating predicted BPU 208, encoder 200 can subtract it from the original BPU to generate residual BPU 210, which is also called a prediction residual.

For example, encoder 200 can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

After residual BPU 210 is generated, encoder 200 can feed residual BPU 210 to transform stage 212 and quantization stage 214 to generate quantized residual coefficients 216. To further compress residual BPU 210, at transform stage 212, encoder 200 can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, encoder 200 can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, encoder 200 and a corresponding decoder (e.g., decoder 300 in FIG. 3) can use the same transform algorithm (thus the same base patterns). Thus, encoder 200 can record only the transform coefficients, from which decoder 300 can reconstruct residual BPU 210 without receiving the base patterns from encoder 200. Compared with residual BPU 210, the transform coefficients can have fewer bits, but they can be used to reconstruct residual BPU 210 without significant quality deterioration. Thus, residual BPU 210 is further compressed.

Encoder 200 can further compress the transform coefficients at quantization stage 214. In the transform process, different base patterns can represent different variation frequencies (e.g., brightness variation frequencies). Because human eyes are generally better at recognizing low-frequency variation, encoder 200 can disregard information of high-frequency variation without causing significant quality deterioration in decoding. For example, at quantization stage 214, encoder 200 can generate quantized residual coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. Encoder 200 can disregard the zero-value quantized residual coefficients 216, by which the transform coefficients are further compressed. The quantization process is also invertible, in which quantized residual coefficients 216 can be reconstructed to the transform coefficients in an inverse operation of the quantization (referred to as "inverse quantization").

Because encoder 200 disregards the remainders of such divisions in the rounding operation, quantization stage 214 can be lossy. Typically, quantization stage 214 can contribute the most information loss in the encoding process. The larger the information loss is, the fewer bits the quantized residual coefficients 216 can need. For obtaining different levels of information loss, encoder 200 can use different values of the quantization parameter or any other parameter of the quantization process.

Encoder 200 can feed prediction data 206 and quantized residual coefficients 216 to binary coding stage 226 to generate video bitstream 228 to complete the forward path. At binary coding stage 226, encoder 200 can encode prediction data 206 and quantized residual coefficients 216 using a binary coding technique, such as, for example, entropy coding, variable length coding, arithmetic coding, Huffman coding, context-adaptive binary arithmetic coding (CABAC), or any other lossless or lossy compression algorithm.

For example, the encoding process of CABAC in binary coding stage 226 may include a binarization step, a context modeling step, and a binary arithmetic coding step. If the syntax element is not binary, encoder 200 first maps the syntax element to a binary sequence. Encoder 200 may select a context coding mode or a bypass coding mode for coding. In some embodiments, for context coding mode, the probability model of the bin to be encoded is selected by the "context", which refers to the previous encoded syntax elements. Then the bin and the selected context model is passed to an arithmetic coding engine, which encodes the bin and updates the corresponding probability distribution of the context model. In some embodiments, for the bypass coding mode, without selecting the probability model by the "context," bins are encoded with a fixed probability (e.g., a probability equal to 0.5). In some embodiments, the bypass coding mode is selected for specific bins in order to speed up the entropy coding process with negligible loss of coding efficiency.

In some embodiments, in addition to prediction data 206 and quantized residual coefficients 216, encoder 200 can encode other information at binary coding stage 226, such as, for example, the prediction mode selected at the prediction stage (e.g., intra prediction stage 2042 or inter prediction stage 2044), parameters of the prediction operation (e.g., intra prediction mode, motion information, etc.), a transform type at transform stage 212, parameters of the quantization process (e.g., quantization parameters), an encoder control parameter (e.g., a bitrate control parameter), or the like. That is, coding information can be sent to binary coding stage 226 to further reduce the bit rate before being packed into video bitstream 228. Encoder 200 can use the output data of binary coding stage 226 to generate video bitstream 228. In some embodiments, video bitstream 228 can be further packetized for network transmission.

Components 218, 220, 222, 224, 232, and 234 can be referred to as a "reconstruction path." The reconstruction path can be used to ensure that both encoder 200 and its corresponding decoder (e.g., decoder 300 in FIG. 3) use the same reference data for prediction.

During the process, after quantization stage 214, encoder 200 can feed quantized residual coefficients 216 to inverse quantization stage 218 and inverse transform stage 220 to generate reconstructed residual BPU 222. At inverse quantization stage 218, encoder 200 can perform inverse quantization on quantized residual coefficients 216 to generate reconstructed transform coefficients. At inverse transform stage 220, encoder 200 can generate reconstructed residual BPU 222 based on the reconstructed transform coefficients. Encoder 200 can add reconstructed residual BPU 222 to predicted BPU 208 to generate prediction reference 224 to be used in prediction stages 2042, 2044 for the next iteration of process.

In the reconstruction path, if intra prediction mode has been selected in the forward path, after generating prediction reference 224 (e.g., the current BPU that has been encoded and reconstructed in the current picture), encoder 200 can directly feed prediction reference 224 to intra prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), encoder 200 can feed prediction reference 224 to loop filter stage 232, at which encoder 200 can apply a loop filter to prediction reference 224 to reduce or eliminate distortion (e.g., blocking artifacts) introduced by the inter prediction. Encoder 200 can apply various loop filter techniques at loop filter stage 232, such as, for example, deblocking, sample adaptive offsets (SAO), adaptive loop filters (ALF), or the like. In SAO, a nonlinear amplitude mapping is introduced within the inter prediction loop after the deblocking filter to reconstruct the original signal amplitudes with a look-up table that is described by a few additional parameters determined by histogram analysis at the encoder side.

The loop-filtered reference picture can be stored in buffer 234 (or "decoded picture buffer") for later use (e.g., to be used as an inter-prediction reference picture for a future picture of video sequence 202). Encoder 200 can store one or more reference pictures in buffer 234 to be used at inter prediction stage 2044. In some embodiments, encoder 200 can encode parameters of the loop filter (e.g., a loop filter strength) at binary coding stage 226, along with quantized residual coefficients 216, prediction data 206, and other information.

Encoder 200 can perform the process discussed above iteratively to encode each original BPU of the original picture (in the forward path) and generate prediction reference 224 for encoding the next original BPU of the original picture (in the reconstruction path). After encoding all original BPUs of the original picture, encoder 200 can proceed to encode the next picture in video sequence 202.

It should be noted that other variations of the encoding process can be used to encode video sequence 202. In some embodiments, stages of process can be performed by encoder 200 in different orders. In some embodiments, one or more stages of the encoding process can be combined into a single stage. In some embodiments, a single stage of the encoding process can be divided into multiple stages. For example, transform stage 212 and quantization stage 214 can be combined into a single stage. In some embodiments, the encoding process can include additional stages that are not shown in FIG. 2. In some embodiments, the encoding process can omit one or more stages in FIG. 2.

For example, in some embodiments, encoder 200 can be operated in a transform skipping mode. In the transform skipping mode, transform stage 212 is bypassed and a transform skip flag is signaled for the TB. This may improve compression for some types of video content such as computer-generated images or graphics mixed with camera-view content (e.g., scrolling text). In addition, encoder 200 can also be operated in a lossless mode. In the lossless mode, transform stage 212, quantization stage 214, and other processing that affects the decoded picture (e.g., SAO and deblocking filters) are bypassed. The residual signal from the intra prediction stage 2042 or inter prediction stage 2044 is fed into binary coding stage 226, using the same neighborhood contexts applied to the quantized transform coefficients. This allows mathematically lossless reconstruction. Therefore, both transform and transform skip residual coefficients are coded within non-overlapped CGs. That is, each CG may include one or more transform residual coefficients, or one or more transform skip residual coefficients.

Figure 3:
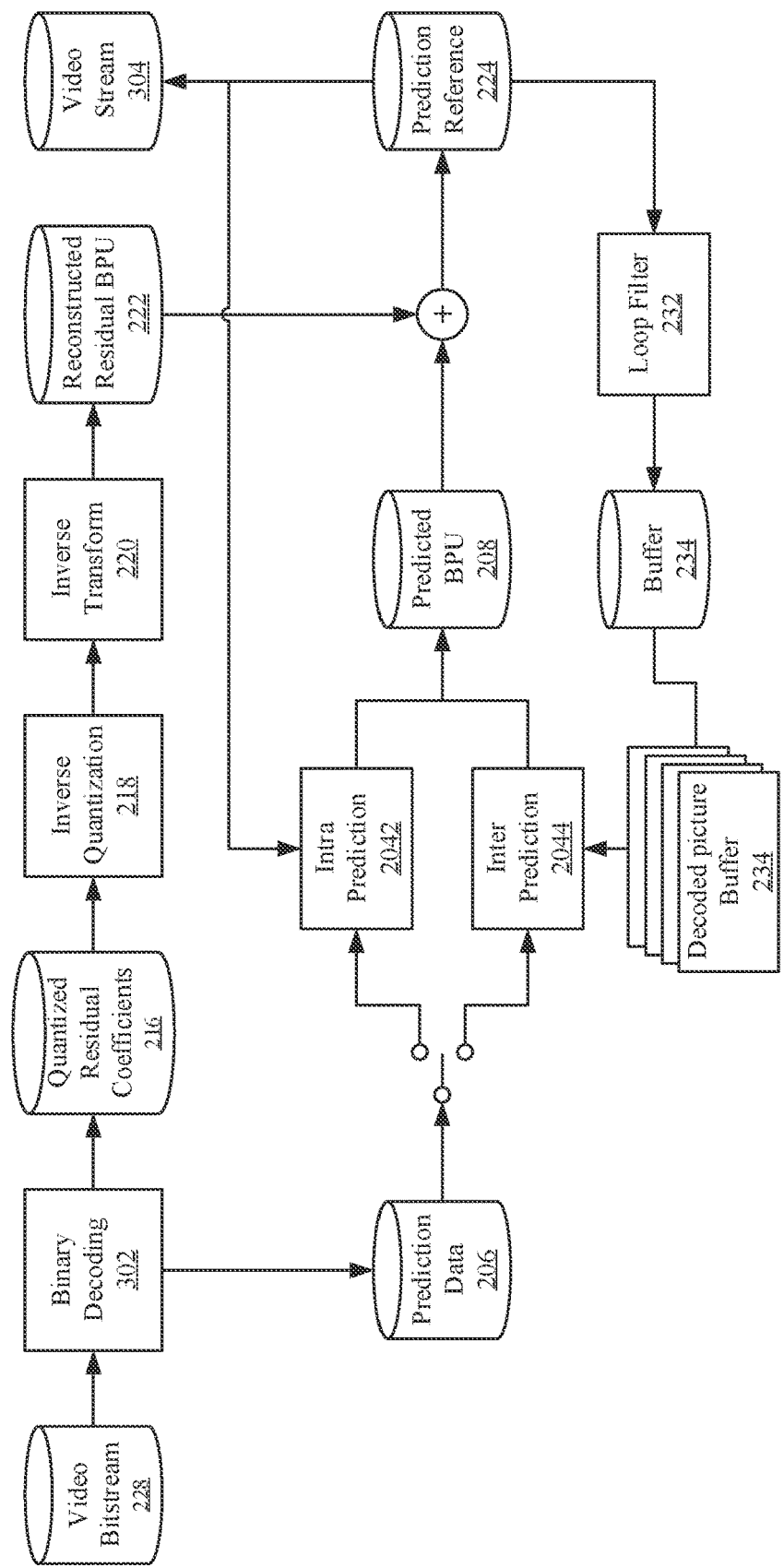
FIG. 3 illustrates a schematic diagram of an exemplary decoder in a video coding system, consistent with some embodiments of the present disclosure.

FIG. 3 illustrates a block diagram of an exemplary decoder 300 of a video coding system (e.g., H.26x series), consistent with some embodiments of the present disclosure. Decoder 300 can perform a decompression process corresponding to the compression process in FIG. 2. The corresponding stages in the compression process and decompression process are labeled with the same numbers in FIG. 2 and FIG. 3.

In some embodiments, the decompression process can be similar to the reconstruction path in FIG. 2. Decoder 300 can decode video bitstream 228 into video stream 304 accordingly. Video stream 304 can be very similar to video sequence 202 in FIG. 2. However, due to the information loss in the compression and decompression process (e.g., quantization stage 214 in FIG. 2), video stream 304 may be not identical to video sequence 202. Similar to encoder 200 in FIG. 2, decoder 300 can perform the decoding process at the level of basic processing units (BPUs) for each picture encoded in video bitstream 228. For example, decoder 300 can perform the process in an iterative manner, in which decoder 300 can decode a basic processing unit in one iteration. In some embodiments, decoder 300 can perform the decoding process in parallel for regions (e.g., slices 114-118) of each picture encoded in video bitstream 228.

In FIG. 3, decoder 300 can feed a portion of video bitstream 228 associated with a basic processing unit (referred to as an "encoded BPU") of an encoded picture to binary decoding stage 302. At binary decoding stage 302, decoder 300 can unpack and decode video bitstream into prediction data 206 and quantized residual coefficients 216. Decoder 300 can use prediction data 206 and quantized residual coefficients to reconstruct video stream 304 corresponding to video bitstream 228.

Decoder 300 can perform an inverse operation of the binary coding technique used by encoder 200 (e.g., entropy coding, variable length coding, arithmetic coding, Huffman coding, context-adaptive binary arithmetic coding, or any other lossless compression algorithm) at binary decoding stage 302. In some embodiments, in addition to prediction data 206 and quantized residual coefficients 216, decoder 300 can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, decoder 300 can depacketize video bitstream 228 before feeding it to binary decoding stage 302.

Decoder 300 can feed quantized residual coefficients 216 to inverse quantization stage 218 and inverse transform stage 220 to generate reconstructed residual BPU 222. Decoder 300 can feed prediction data 206 to intra prediction stage 2042 and inter prediction stage 2044 to generate predicted BPU 208. Particularly, for an encoded basic processing unit (referred to as a "current BPU") of an encoded picture (referred to as a "current picture") that is being decoded, prediction data 206 decoded from binary decoding stage 302 by decoder 300 can include various types of data, depending on what prediction mode was used to encode the current BPU by encoder 200. For example, if intra prediction was used by encoder 200 to encode the current BPU, prediction data 206 can include coding information such as a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by encoder 200 to encode the current BPU, prediction data 206 can include coding information such as a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more MVs respectively associated with the matching regions, or the like.

Accordingly, the prediction mode indicator can be used to select whether inter or intra prediction module will be invoked. Then, parameters of the corresponding prediction operation can be sent to the corresponding prediction module to generate the prediction signal(s). Particularly, based on the prediction mode indicator, decoder 300 can decide whether to perform an intra prediction at intra prediction stage 2042 or an inter prediction at inter prediction stage 2044. The details of performing such intra prediction or inter prediction are described in FIG. 2 and will not be repeated hereinafter. After performing such intra prediction or inter prediction, decoder 300 can generate predicted BPU 208.

After predicted BPU 208 is generated, decoder 300 can add reconstructed residual BPU 222 to predicted BPU 208 to generate prediction reference 224. In some embodiments, prediction reference 224 can be stored in a buffer (e.g., a decoded picture buffer in a computer memory). Decoder 300 can feed prediction reference 224 to intra prediction stage 2042 and inter prediction stage 2044 for performing a prediction operation in the next iteration.

For example, if the current BPU is decoded using the intra prediction at intra prediction stage 2042, after generating prediction reference 224 (e.g., the decoded current BPU), decoder 300 can directly feed prediction reference 224 to intra prediction stage 2042 for later usage (e.g., for extrapolation of a next BPU of the current picture). If the current BPU is decoded using the inter prediction at inter prediction stage 2044, after generating prediction reference 224 (e.g., a reference picture in which all BPUs have been decoded), decoder 300 can feed prediction reference 224 to loop filter stage 232 to reduce or eliminate distortion (e.g., blocking artifacts). In addition, prediction data 206 can further include parameters of a loop filter (e.g., a loop filter strength). Accordingly, decoder 300 can apply the loop filter to prediction reference 224, in a way as described in FIG. 2. For example, loop filters such as deblocking, SAO or ALF may be applied to form the loop-filtered reference picture, which are stored in buffer 234 (e.g., a decoded picture buffer (DPB) in a computer memory) for later use (e.g., to be used at inter prediction stage 2044 for prediction of a future encoded picture of video bitstream 228). In some embodiments, reconstructed pictures from buffer 234 can also be sent to a display, such as a TV, a PC, a smartphone, or a tablet to be viewed by the end-users.

Decoder 300 can perform the decoding process iteratively to decode each encoded BPU of the encoded picture and generate prediction reference 224 for encoding the next encoded BPU of the encoded picture. After decoding all encoded BPUs of the encoded picture, decoder 300 can output the picture to video stream 304 for display and proceed to decode the next encoded picture in video bitstream 228.

Figure 4:
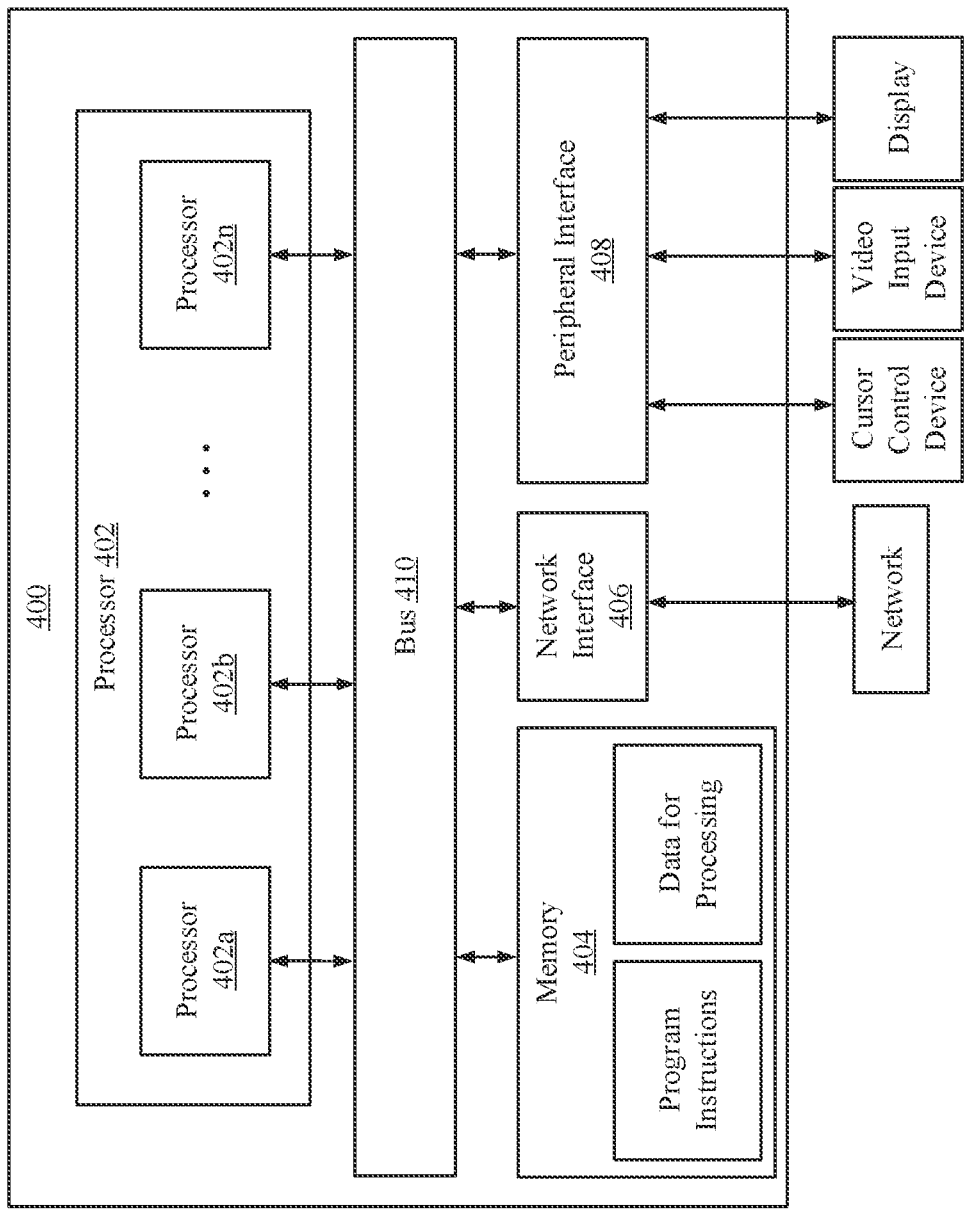
FIG. 4 illustrates a block diagram of an exemplary apparatus for encoding or decoding a video, consistent with some embodiments of the present disclosure.

FIG. 4 is a block diagram of an exemplary apparatus 400 for encoding or decoding a video, according to some embodiments of the present disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in FIG. 2 and FIG. 3) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in the present disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process of encoder 200 or decoder 300) can be implemented as any combination of any software or hardware modules in apparatus 400. For example, some or all stages of process encoder 200 or decoder 300 can be implemented as one or more software modules of apparatus 400, such as program instructions that can be loaded into memory 404. For another example, some or all stages of process encoder 200 or decoder 300 can be implemented as one or more hardware modules of apparatus 400, such as a specialized data processing circuit (e.g., an FPGA, an ASIC, an NPU, or the like).

As discussed above, the video encoding or decoding process can be achieved using different modes. In some normal inter coding modes, encoder 200 can signal MV(s), corresponding reference picture index for each reference picture list and reference picture list usage flag, or other information explicitly per each CU. On the other hand, when a CU is coded with a skip mode and or a direct mode, the motion information, including reference index and motion vector, is not signaled in video bitstream 228 to decoder 300. Instead, the motion information can be derived at decoder 300 using the same rule as encoder 200 does.

For example, when a CU is coded with a skip mode, the CU is associated with one PU and has no significant residual coefficients, no coded MV delta or reference picture index. In the skip mode, the signaling of the residual data can be skipped by setting residuals to be zero. In the direct mode, the residual data is transmitted while the motion information and partitions are derived. Compared with inter modes signaling the motion information, the bits dedicated on the motion information can thus be saved in the skip mode or the direct mode.

In some embodiments, encoder 200 and decoder 300 need to follow the rule specified in the standard to derive the motion vector and reference index to perform inter prediction 2044. In some embodiments, the skip mode and the direct mode may share the same motion information derivation rule. The derivation of the motion information can be based on the spatial or temporal neighboring block. Accordingly, the skip mode and the direct mode are suitable for the case where the motion information of the current block is close to that of the spatial or temporal neighboring blocks of the current block.

For example, in AVS3, the skip mode or the direct mode may enable the motion information (e.g., reference index, MVs, etc.) to be inherited from a spatial or temporal (co-located) neighbor. A candidate list of motion candidates can be generated from these neighbors. In some embodiments, to derive the motion information used for inter prediction 2044 in skip mode or direct mode, encoder 200 may first derive the candidate list of motion candidates and select one of the motion candidates to perform inter prediction 2044. When signaling video bitstream 228, encoder 200 may signal an index of the selected candidate. At the decoder side, decoder 300 can obtain the index parsed from video bitstream 228, derive the same candidate list, and use the same motion candidate to perform inter prediction 2044.

The candidate list of motion candidates may include multiple candidates obtained based on different approaches. For example, in AVS3 specification, a candidate list may have 12 candidates, including a temporal motion vector predictor (TMVP) candidate, one or more spatial motion vector predictor (SMVPs) candidates, one or more motion vector angular prediction (MVAP) candidates, and one or more history-based motion vector predictor (HMVP) candidates. In some embodiments, the encoder or the decoder can first derive and add TMVP and SMVP candidates in the candidate list. After adding TMVP and SMVP candidates, the encoder or the decoder derives and add the MVAP candidates and HMVP candidates. In some embodiments, the number of MVAP candidates stored in the candidate list may be varied according to the number of available direction(s) in the MVAP process. For example, the number of MVAP candidate(s) may be between 0 to a maximum number (e.g., 5). After adding MVAP candidate(s), one or more HMVP candidates can be added to the candidate list until the total number of the candidates reaches the target number (e.g., 12 candidates in AVS3 specification).

Figure 5:
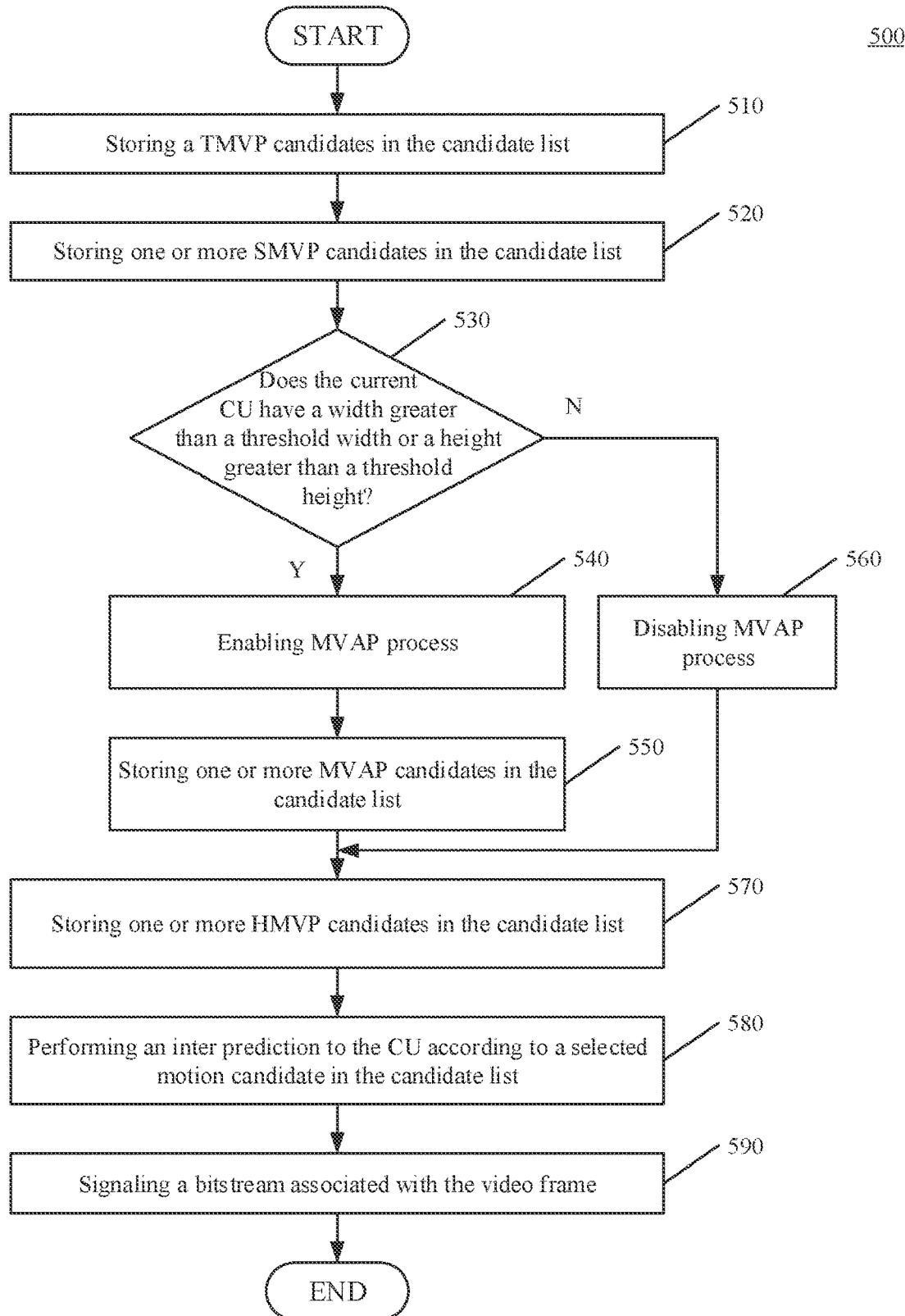
FIG. 5 illustrates a flowchart of an exemplary process for a video encoding method, consistent with some embodiments of the present disclosure.

FIG. 5 illustrates a flowchart of an exemplary video encoding method 500, consistent with some embodiments of the present disclosure. In some embodiments, video encoding method 500 can be performed by an encoder (e.g., encoder 200 in FIG. 2) to generate video bitstream associated with a video frame. For example, the encoder can be implemented as one or more software or hardware components of an apparatus (e.g., apparatus 400 in FIG. 4) for encoding or transcoding a video sequence (e.g., video sequence 202 in FIG. 2) to generate the bitstream (e.g., video bitstream 228 in FIG. 2) for the video frame or the video sequence including one or more CUs. For example, a processor (e.g., processor 402 in FIG. 4) can perform video encoding method 500.

Referring to video encoding method 500, at steps 510-570, the encoder derives a candidate list for the inter prediction. At step 510, the encoder stores a TMVP candidate associated with the current CU as one of the motion candidates in the candidate list. In some embodiments, TMVP can be derived from the MV of collocated block in a certain reference frame. The certain reference frame here is specified as the reference frame with reference index being 0 in a Reference Picture List 1 (i.e., list1) for B-frame (i.e., Bidirectional Predicted Picture) or a Reference Picture List 0 (i.e., list0) for P-frame (i.e., Predicted Picture). When the MV of the collocated block is unavailable, a MV predictor (MVP) derived according to the MV of spatial neighboring blocks can be used as TMVP.

Figure 6:
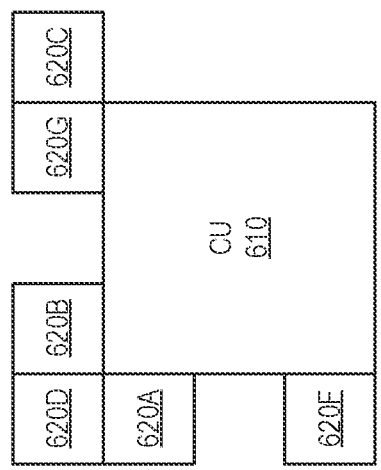
FIG. 6 illustrates exemplary neighboring blocks used for deriving spatial motion vector predictors (SMVPs), consistent with some embodiments of the present disclosure.

At step 520, the encoder stores one or more SMVP candidates associated with the current CU as one or more of the motion candidates in the candidate list. Reference is made to FIG. 6, which illustrates exemplary neighboring blocks 620A, 620B, 620C, 620D, 620F, and 620G used for deriving spatial motion vector predictors (SMVPs) for a CU 610, consistent with some embodiments of the present disclosure.

In some embodiments, the candidate list may include three SMVP candidates associated with the current CU. As illustrated in FIG. 6, these SMVP candidates can be derived from neighboring blocks 620F, 620G, 620C, 620B, 620A, and 620D of CU 610. For example, a first SMVP candidate can be a bi-prediction candidate, a second SMVP candidate can be an uni-prediction candidate with reference frame in a Reference Picture List 0 (i.e., RefPicList0 or list0), and a third SMVP candidate can be an uni-prediction candidate with reference frame in a Reference Picture List 1 (i.e., RefPicList1 or list1). Each of the reference picture lists may include zero or more reference pictures. In some embodiments, these SMVP candidates mentioned above are set to the first available MV of the six neighboring blocks 620F, 620G, 620C, 620B, 620A, and 620D in a specified order, but the present disclosure is not limited thereto.

Referring back to FIG. 5, at step 530, the encoder determines whether the current CU have a width greater than a threshold width (e.g., 8 pixels) or a height greater than a threshold height (e.g., 8 pixels). In response to a coding unit having the width greater than the threshold width or the height greater than the threshold height (step 530—yes), the encoder, at step 540, enables a MVAP process to obtain one or more MVAP candidates. At step 550, the encoder stores the obtained MVAP candidate(s) in the candidate list. Details of the MVAP process will be discussed in the paragraphs below.

In response to the current CU having the width equal to the threshold width and the height equal to the threshold height (step 530—No), the encoder, at step 560, disables the MVAP process. Accordingly, steps 540 and 550 are not performed and the encoder derives the candidate list without storing MVAP candidate(s) in the candidate list.

At step 570, the encoder stores one or more HMVP candidates associated with the current CU in the candidate. HMVP can be derived from the motion information of the previously encoded or decoded blocks. For example, after encoding (or decoding) an inter coded block, encoder 200 in FIG. 2 (or decoder 300 in FIG. 3) may add the motion information associated with the encoded/decoded block to a last entry of a HMVP table. In some embodiments, the size of the HMVP table can be set to 8, but the present disclosure is not limited thereto. When inserting a new motion candidate to the table, a constrained first-in-first-out (FIFO) rule can be utilized. Redundancy check can be applied first to determine whether an identical motion candidate already exists in the table. If the identical motion candidate is found in the table, this candidate can be moved to the last entry of the table instead of inserting a new identical entry. Candidates in the HMVP table are used as HMVP candidates for the skip mode and the direct mode.

In some embodiments, the encoder can first check whether a HMVP candidate stored in the HMVP table is identical to any motion candidate in the candidate list. In response to the HMVP being different to the motion candidates in the candidate list, the encoder stores the HMVP candidate in the candidate list. This process can be referred as a "pruning" process.

For example, the HMVP table can be checked from its last entry to its first entry. If a candidate in HMVP table is not identical to any candidates (e.g., TMVP or SMVP candidates) in the candidate list, the candidate in HMVP table is put into the candidate list as a HMVP candidate. If a candidate in HMVP table is identical to one of TMVP candidate or SMVP candidate, this candidate is not put into the candidate list to avoid redundancies.

After the candidate list associated with the current CU for the inter prediction is derived in steps 510-570, at step 580, the encoder performs an inter prediction (e.g., inter prediction 2044 in FIG. 2) to the CU according to a selected motion candidate in the candidate list. Then, at step 590, the encoder can signal a bitstream (e.g., video bitstream 228 in FIG. 2) associated with the video frame. The bitstream can include CU(s) coded in a skip mode or a direct mode and an index of the selected motion candidate.

Figure 7:
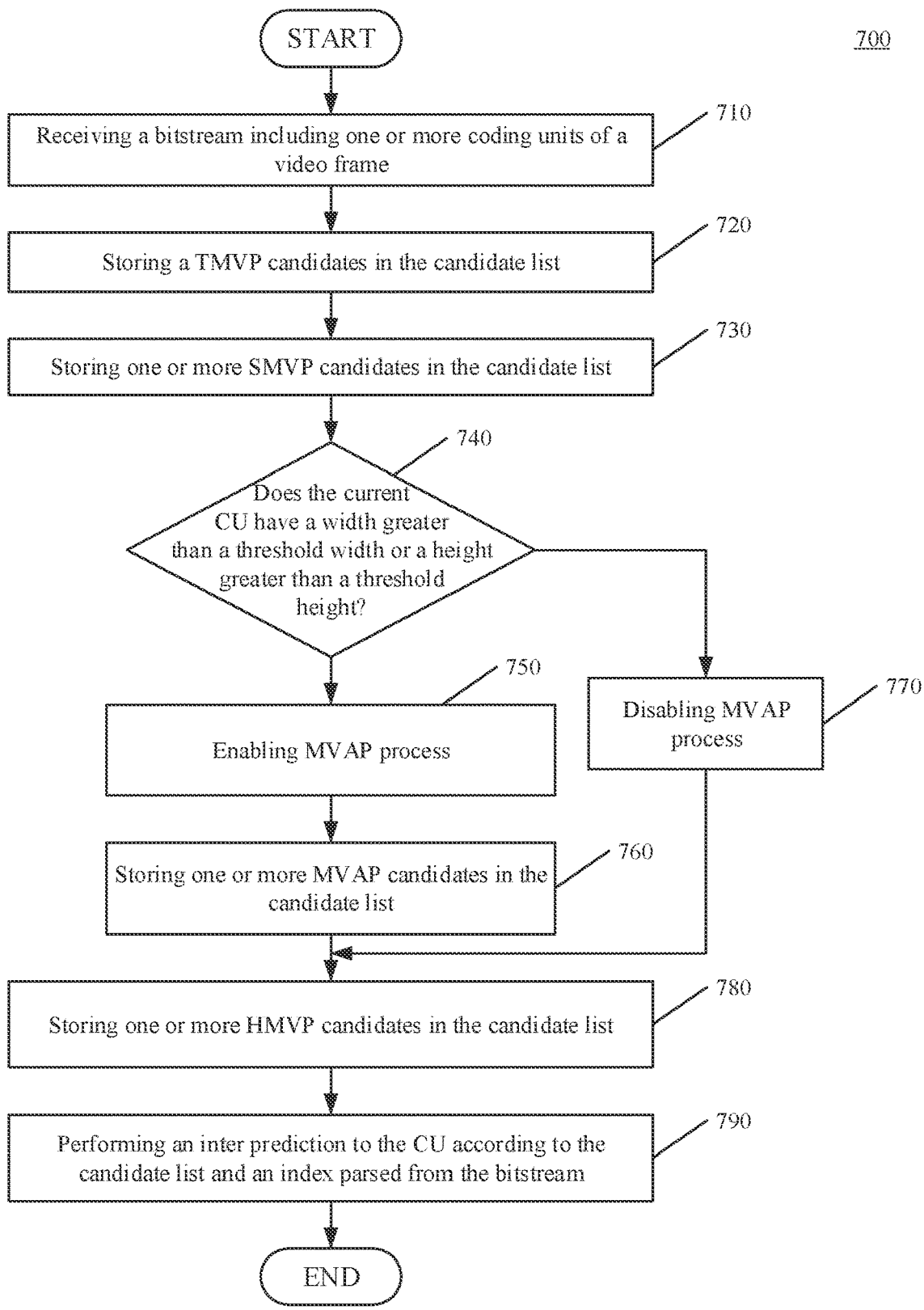
FIG. 7 illustrates a flowchart of an exemplary process for a video decoding method, consistent with some embodiments of the present disclosure.

As explained above, video bitstream 228 generated by encoder 200 using video encoding method 500 can be decoded by decoder 300 by an inverse operation. FIG. 7 is an exemplary video decoding method 700 corresponding to video encoding method 500 in FIG. 5, consistent with some embodiments of the present disclosure. In some embodiments, video decoding method 700 can be performed by a decoder (e.g., decoder 300 in FIG. 3) to decode video bitstream 228 in FIG. 3. For example, the decoder can be implemented as one or more software or hardware components of an apparatus (e.g., apparatus 400 in FIG. 4) for decoding the bitstream (e.g., video bitstream 228 in FIG. 3) to reconstruct a video frame or a video sequence (e.g., video stream 304 in FIG. 3) of the bitstream. For example, a processor (e.g., processor 402 in FIG. 4) can perform video decoding method 700.

Referring to video decoding method 700, at step 710, the decoder receives a bitstream (e.g., video bitstream 228 in FIG. 3). The bitstream received from the encoder side includes one or more CUs of a video frame, and the index of the selected motion candidate for CU(s) coded in the skip mode or the direct mode.

At steps 720-780, similar to steps 510-570 of video encoding method 500, the decoder also derives the same candidate list for the inter prediction. At step 720, the decoder stores a TMVP candidate associated with the current CU as one of the motion candidates in the candidate list. At step 730, the decoder stores one or more SMVP candidates associated with the current CU as one or more of the motion candidates in the candidate list. At step 740, the decoder determines whether the current CU has a width greater than a threshold width or a height greater than a threshold height. In response to a coding unit having the width greater than the threshold width or the height greater than the threshold height (step 740—yes), the decoder, at step 750, enables a MVAP process to obtain one or more MVAP candidates associated with the current CU. At step 760, the decoder stores the obtained MVAP candidate(s) in the candidate list. In response to a coding unit having the width equal to the threshold width and the height equal to the threshold height (step 740—No), the decoder, at step 770, disables the MVAP process. Accordingly, steps 750 and 760 are not performed and the decoder derives the candidate list without storing MVAP candidate(s) in the candidate list. At step 780, the decoder stores one or more HMVP candidates in the candidate.

Operations of deriving the candidate list in steps 720-780 performed by the decoder is similar to those of steps 510-570 performed by the encoder, which have been previously discussed in detail, and thus are not repeated herein.

After the candidate list associated with the current CU for the inter prediction is derived, at step 790, the decoder performs an inter prediction to the CU(s) according to the candidate list and an index parsed from the bitstream. By the index parsed from the bitstream, the decoder can select the same motion candidate for the inter prediction at the decoder side, and thus reconstruct the video frame or the video sequence for the bitstream including CU(s) coded in the skip mode or the direct mode.

In the MVAP process mentioned above, one CU is split into multiple subblocks (e.g., 8×8 subblocks) and each subblock has its own motion information. If the MVAP process is applied to CUs having the threshold size (e.g., 8×8), one CU includes only one subblock. As a result, the MVAP candidate of the subblocks of the CU may be identical to the SMVP candidate, which causes the redundancy of the candidate list. By applying the MVAP process to CUs being greater than a threshold size (e.g., 8×8) in method 500 and method 700, the potential redundancy in the candidate list for the skip mode and the direct mode may be removed.

In addition, by disabling the MVAP process for the CUs having the threshold size, the number of cycles for constructing the candidate list can be smaller than that for a larger CU. Accordingly, the candidate list construction can be simplified, which may reduce the hardware resources required by the encoder and the decoder.

Figure 8:
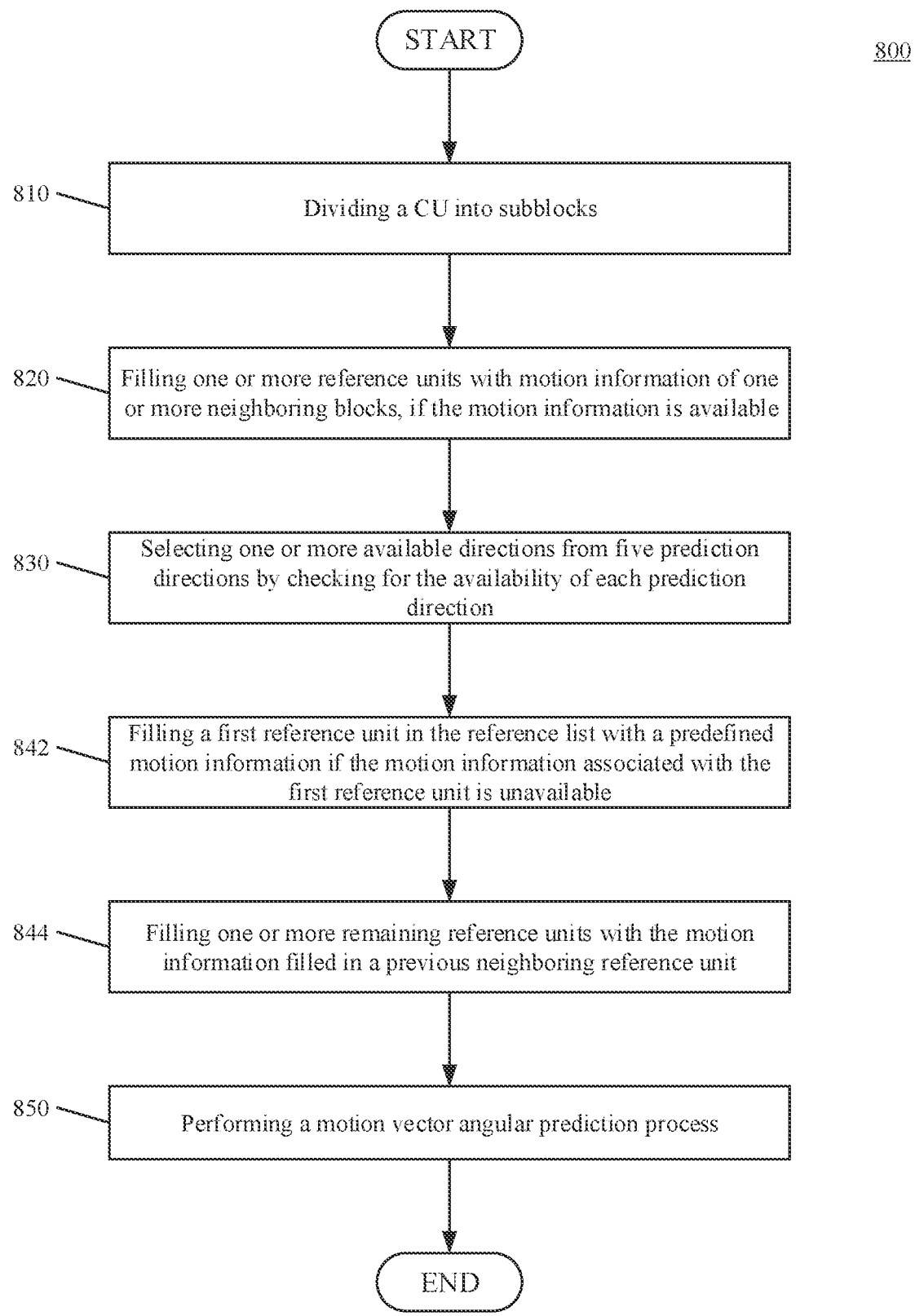
FIG. 8 illustrates a flowchart of an exemplary MVAP process, consistent with some embodiments of the present disclosure.

FIG. 8 illustrates a flowchart of an exemplary MVAP process 800 associated with the coding unit, consistent with some embodiments of the present disclosure. As shown in FIG. 8, MVAP process 800 includes steps 810, 820, 830, 842, 844, and 850. In some embodiments, a MVAP mode, which is one of the inter prediction modes, may be applied to a CU with width and height greater than 4 pixels to perform the MVAP process 800.

Figure 9:
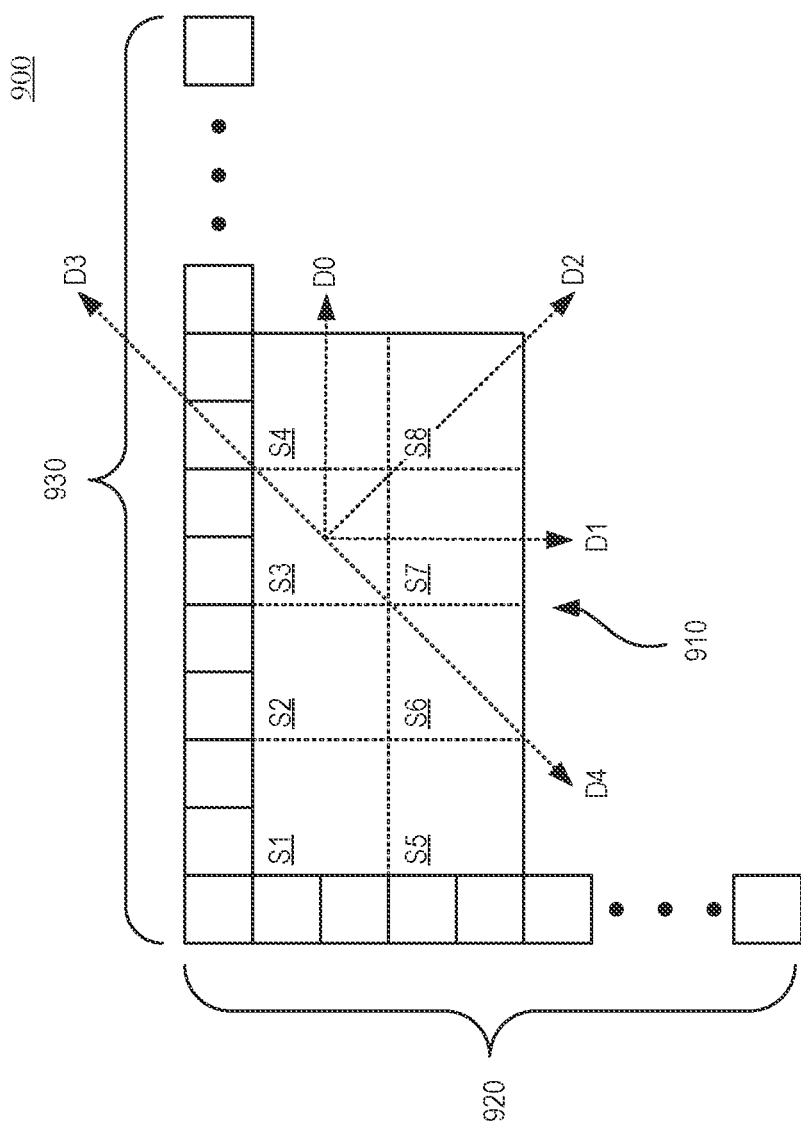
FIG. 9 illustrates subblocks in a coding unit in the MVAP process, consistent with some embodiments of the present disclosure.

At step 810, encoder 200 or decoder 300 divides a coding unit into subblocks. Reference is made to FIG. 9, which illustrates subblocks S1-S8 in a coding unit 910 associated with a video frame 900 in a MVAP process, consistent with some embodiments of the present disclosure. In the MVAP process, a CU 910 is split into subblocks S1-S8. In some embodiments, the size of each subblock S1-S8 is 8×8. For each 8×8 subblock, the motion information, including the reference index and MV, is predicted from a reference motion information. As shown in FIG. 9, the reference motion information of a subblock S3 in a current CU 910 is the motion information (e.g., reference MVs) of horizontal and vertical neighboring blocks 920 and 930 of current CU 910 in five difference directions D0-D4. For example, direction D0 is referred to as a horizontal direction, direction D1 is referred to as a vertical direction, direction D2 is referred to as a horizontal up direction, direction D3 is referred to as a horizontal down direction, and direction D4 is referred as a vertical down direction.

FIG. 10 illustrates an exemplary reference motion information list 1000 for use in the MVAP process, consistent with some embodiments of the present disclosure. For a M×N CU coded in the MVAP mode, a reference motion information list is filled with the motion information of neighboring blocks. The number and size of reference motion information list 1000 is (2M/4+2N/4+1) in 4×4 units. For example, as shown in FIG. 10, for a 32×16 CU 910, reference motion information list 1000 includes 25 4×4 units U0-U24.

Encoder 200 or decoder 300 fills the reference unit(s) (e.g., reference units U0-U24 in FIG. 10) in reference motion information list 1000 by performing steps 820, 830, 842, and 844. At step 820, encoder 200 or decoder 300 fills the reference unit(s) (e.g., one or more of reference units U0-U24 in FIG. 10) in the reference list (e.g., reference motion information list 1000 in FIG. 10) with the motion information of the neighboring block(s) of the coding unit (e.g., CU 910 in FIG. 10), if the motion information is available.

Alternatively stated, at step 820 of FIG. 8, the available motion information is copied to corresponding one of reference unit(s) U0-U24. For some neighboring block(s), the motion information may be unavailable if the neighboring blocks are coded in an intra coding mode, and corresponding reference units U0-U24 remain the blank.

At step 830, to reduce redundant candidates, encoder 200 or decoder 300 selects one or more available directions from five prediction directions (e.g., directions D0-D4 in FIG. 9) by checking for the availability of each prediction direction. For example, encoder 200 or decoder 300 may check the availability of five prediction directions by comparing the reference motion information. In some embodiments, to reduce the complexity, a subset of 4×4 units U0-U24 is involved in the comparison, instead of comparing the motion information of each of 4×4 units U0-U24. The subset of 4×4 units U0-U24 may be different according to different prediction directions D0-D4.

In one example provided in FIG. 10, for direction D0, MVs in units U11 and U9 are compared. For direction D1, MVs in units U13 and U17 are compared. For direction D2, MVs in units U11, U12 and U13 are compared. For direction D3, MVs in units U3, U7 and U9 are compared. For direction D4, MVs in units U17, U21 and U23 are compared. Please note that the subset of 4×4 units U0-U24 to be used in the comparison disclosed herein is merely an example and not meant to limit the present disclosure. In various embodiments, different subsets may be used.

When the motion information of the subset of 4×4 units is not identical, the corresponding prediction direction is available. For example, if the motion information in unit U11 and the motion information in unit U9 is not identical, the corresponding prediction direction D0 is available, and a MVAP candidate corresponding to direction D0 can be obtained. In some embodiments, if any of the motion information of the subset of 4×4 units is unavailable, the motion information of the subset of 4×4 units is considered as identical.

If the motion information of the subset of 4×4 units are identical, the corresponding prediction direction is unavailable. For example, if the motion information in unit U11 and the motion information in unit U9 is identical, the corresponding prediction direction D0 is unavailable, and a MVAP candidate corresponding to direction D0 would not be obtained. Alternatively stated, the number of MVAP candidates is within the range from 0 to 5, according to the number of available direction(s).

Referring back to FIG. 8, at steps 842 and 844, encoder 200 or decoder 300 fills the remaining reference unit(s) of which the motion information is unavailable based on a predefined motion information or the motion information in the neighboring reference unit. Particularly, at step 842, encoder 200 or decoder 300 fills a first reference unit (e.g., unit U0) in the reference list with a predefined motion information if the motion information associated with the first reference unit is unavailable. At step 844 encoder 200 or decoder 300 fills remaining reference unit(s) (e.g., one or more of units U1-U24) with the motion information filled in a previous neighboring reference unit in the reference list, if the motion information associated with the remaining reference unit(s) is unavailable.

Figures 11A, 11B:
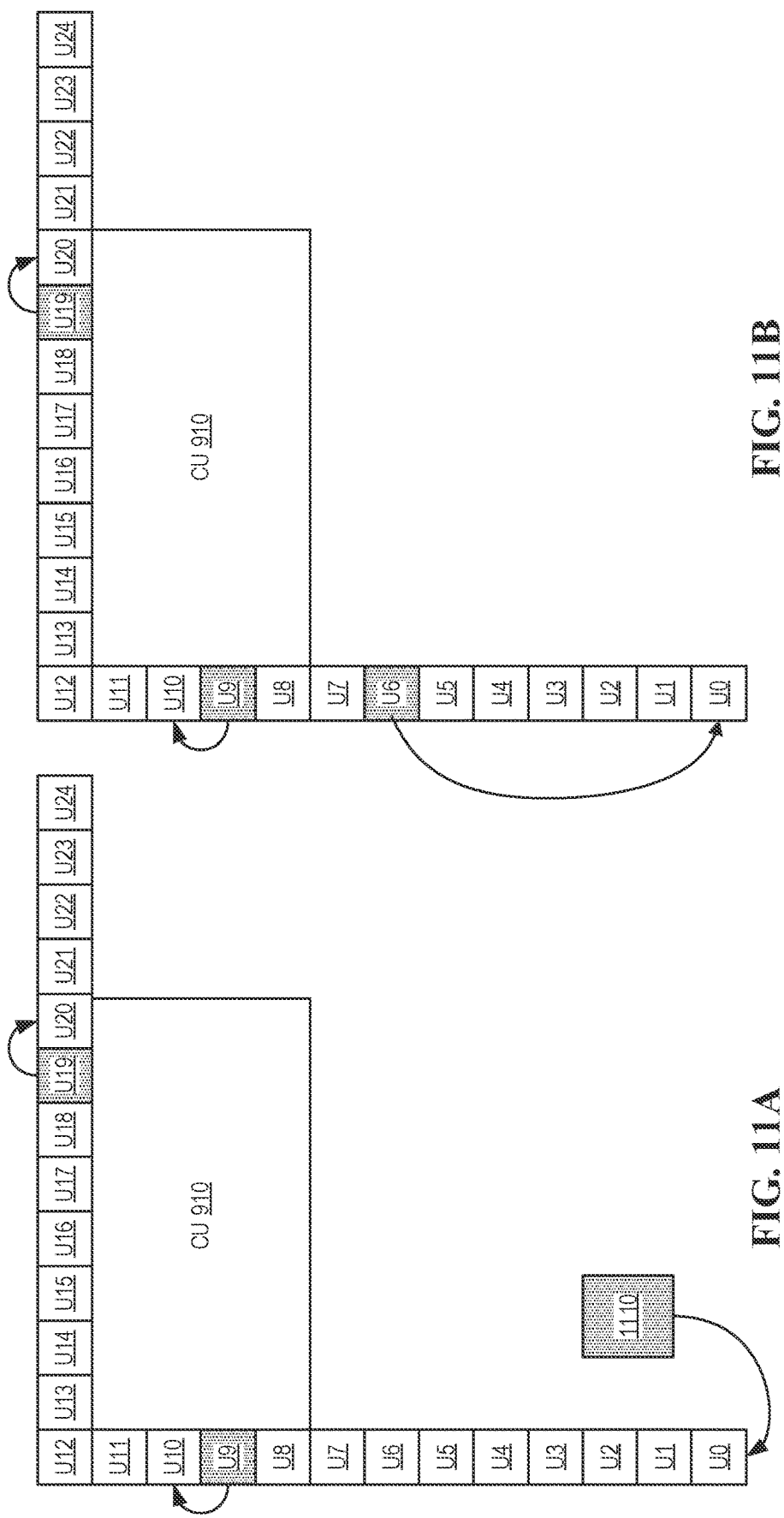
FIG. 11A illustrates an exemplary process of populating the reference motion information list for use in the MVAP process, consistent with some embodiments of the present disclosure.
FIG. 11B illustrates another exemplary process of populating the reference motion information list for use in the MVAP process, consistent with some embodiments of the present disclosure.

FIG. 11A illustrates an exemplary process of populating the reference motion information list for use in the MVAP process in steps 842 and 844, consistent with some embodiments of the present disclosure. In some embodiments, the availability of motion information can be checked from the bottom-left unit (e.g., unit U0) to top-right unit (e.g., unit U24). In the case that the motion information of the first entry (e.g., the bottom-left unit U0) of the reference motion information list is unavailable, a predefined motion information 1110 is filled in the first entry. For example, in some embodiments, encoder 200 or decoder 300 may fill the first reference unit with a zero-motion vector and a reference index set to zero. In some other embodiments, encoder 200 or decoder 300 may fill the first reference unit with the motion information stored in a last entry of the HMVP table. In yet some other embodiments, encoder 200 or decoder 300 may fill the first reference unit with the motion information of a TMVP candidate or a SMVP candidate.

At step 844, in the case that the motion information of any of units U1-U24 is unavailable, the motion information can be copied from the bottom or left neighboring 4×4 unit. For example, if the motion information of unit U10 is unavailable, unit U10 is filled with the motion information from the bottom neighboring unit U9, as shown in FIG. 11A. If the motion information of unit U20 is unavailable, unit U20 is filled with the motion information from the left neighboring unit U19, as shown in FIG. 11A.

FIG. 11B illustrates another exemplary process of populating the reference motion information list for use in the MVAP process, consistent with some embodiments of the present disclosure. In the embodiments of FIG. 11B, if the motion information of the bottom-left unit U0 is unavailable, unit U0 is filled with the first available motion information (e.g., unit U6) found in the reference motion information list, as shown in FIG. 11B.

Compared to the embodiments of FIG. 11B, by performing MVAP process 800 and assigning the predefined motion information at step 832 in the case that the motion information of the bottom-left unit U0 is unavailable, encoder 200 or decoder 300 is not required to search for the first available motion information shown in FIG. 11B. Accordingly, a simplified and hardware-friendly process of filing the reference motion information list can be achieved.

Referring back to FIG. 8, after steps 820-844, each reference unit in the reference motion information list is filled with the motion information. Encoder 200 or decoder 300 can then, at step 850, perform the MVAP process to obtain one or more MVAP candidates for each subblock by using the reference list according to one or more prediction directions.

In some embodiments, the MVAP candidate of each 8×8 subblock can be predicted from the reference motion information list according to the selected prediction direction. FIGS. 12A-12E illustrate exemplary MVAP candidates for each subblock S1-S8, consistent with some embodiments of the present disclosure. As shown in FIG. 12A, in prediction direction D0, the MVAP candidate of subblocks S1, S2, S3, and S4 can be the motion information filed in reference unit U11, and the MVAP candidate of subblocks S5, S6, S7, and S8 can be the motion information filed in reference unit U9.

As shown in FIG. 12B, in prediction direction D1, the MVAP candidate of subblocks S1 and S5 can be the motion information filed in reference unit U13, the MVAP candidate of subblocks S2 and S6 can be the motion information filed in reference unit U15, the MVAP candidate of subblocks S3 and S7 can be the motion information filed in reference unit U17, and the MVAP candidate of subblocks S4 and S8 can be the motion information filed in reference unit U19.

As shown in FIG. 12C, in prediction direction D2, the MVAP candidate of subblock S5 can be the motion information filed in reference unit U10, the MVAP candidate of subblocks S1 and S6 can be the motion information filed in reference unit U12, the MVAP candidate of subblocks S2 and S7 can be the motion information filed in reference unit U14, the MVAP candidate of subblocks S3 and S8 can be the motion information filed in reference unit U16, and the MVAP candidate of subblock S4 can be the motion information filed in reference unit U18.

As shown in FIG. 12D, in prediction direction D3, the MVAP candidate of subblock S1 can be the motion information filed in reference unit U9, the MVAP candidate of subblocks S2 and S5 can be the motion information filed in reference unit U7, the MVAP candidate of subblocks S3 and S6 can be the motion information filed in reference unit U5, the MVAP candidate of subblocks S4 and S7 can be the motion information filed in reference unit U3, and the MVAP candidate of subblock S8 can be the motion information filed in reference unit U1.

As shown in FIG. 12E, in prediction direction D4, the MVAP candidate of subblock S1 can be the motion information filed in reference unit U15, the MVAP candidate of subblocks S2 and S5 can be the motion information filed in reference unit U17, the MVAP candidate of subblocks S3 and S6 can be the motion information filed in reference unit U19, the MVAP candidate of subblocks S4 and S7 can be the motion information filed in reference unit U21, and the MVAP candidate of subblock S8 can be the motion information filed in reference unit U23. As shown in FIGS. 12A-12E, the MV prediction can be applied to 8×8 subblocks S1-S8 within the current block. Accordingly, the MVAP candidate is a subblock level candidate and different subblocks S1-S8 within the current block may have different MVs.

Figure 13:
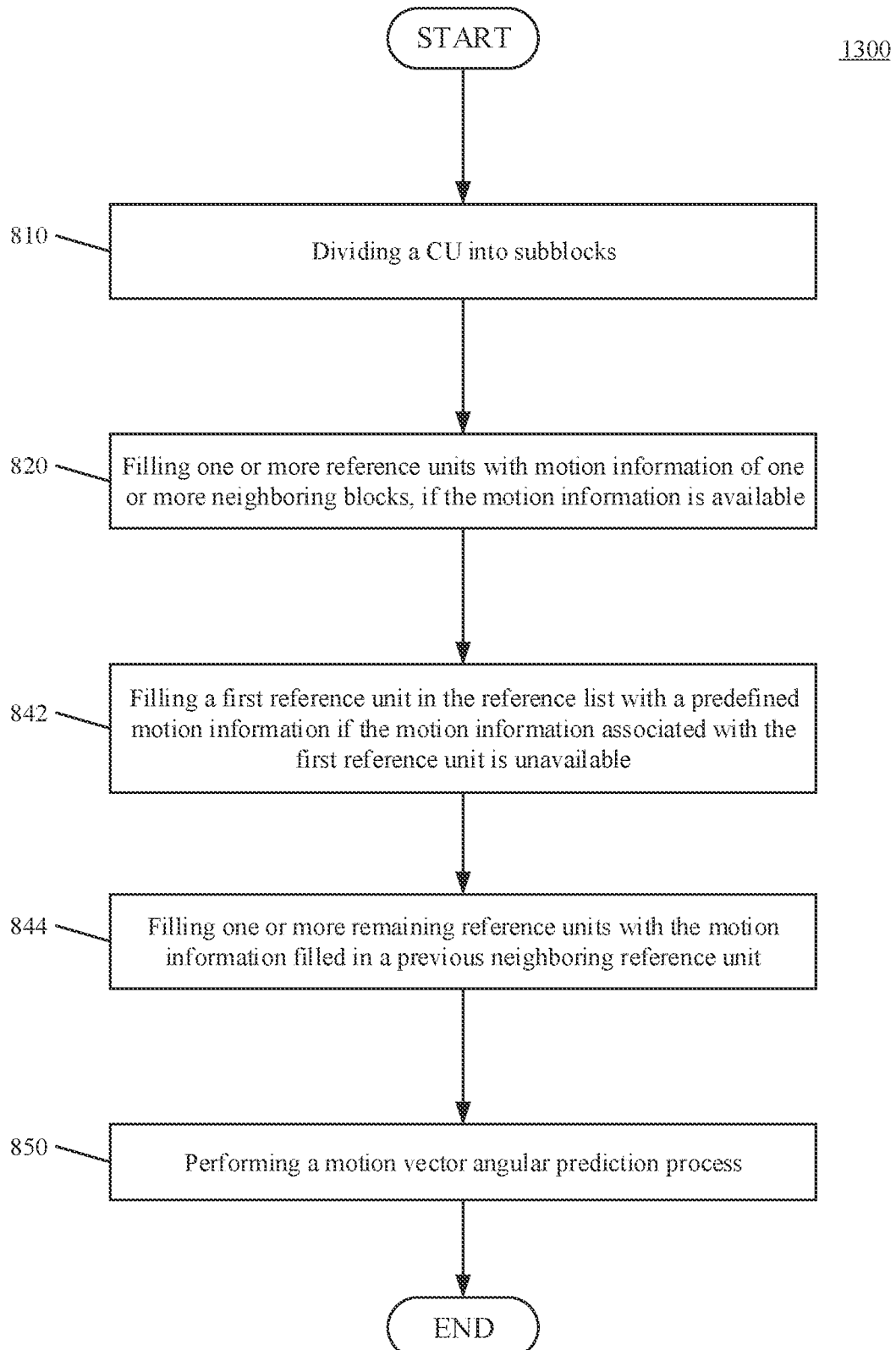
FIG. 13 illustrates a flowchart of another exemplary MVAP process, consistent with some embodiments of the present disclosure.

FIG. 13 illustrates a flowchart of another exemplary MVAP process 1300, consistent with some embodiments of the present disclosure. Compared to MVAP process 800, in MVAP process 1300, encoder 200 or decoder 300 may bypass step 820 and enable the MVAP process for the coding unit without checking for the availability of the prediction directions. Accordingly, encoder 200 or decoder 300 can derive a candidate list storing motion candidates including five MVAP candidates (e.g., MVAP candidates shown in FIGS. 12A-12E) for each subblock according to five prediction directions D0-D4.

Figure 14:
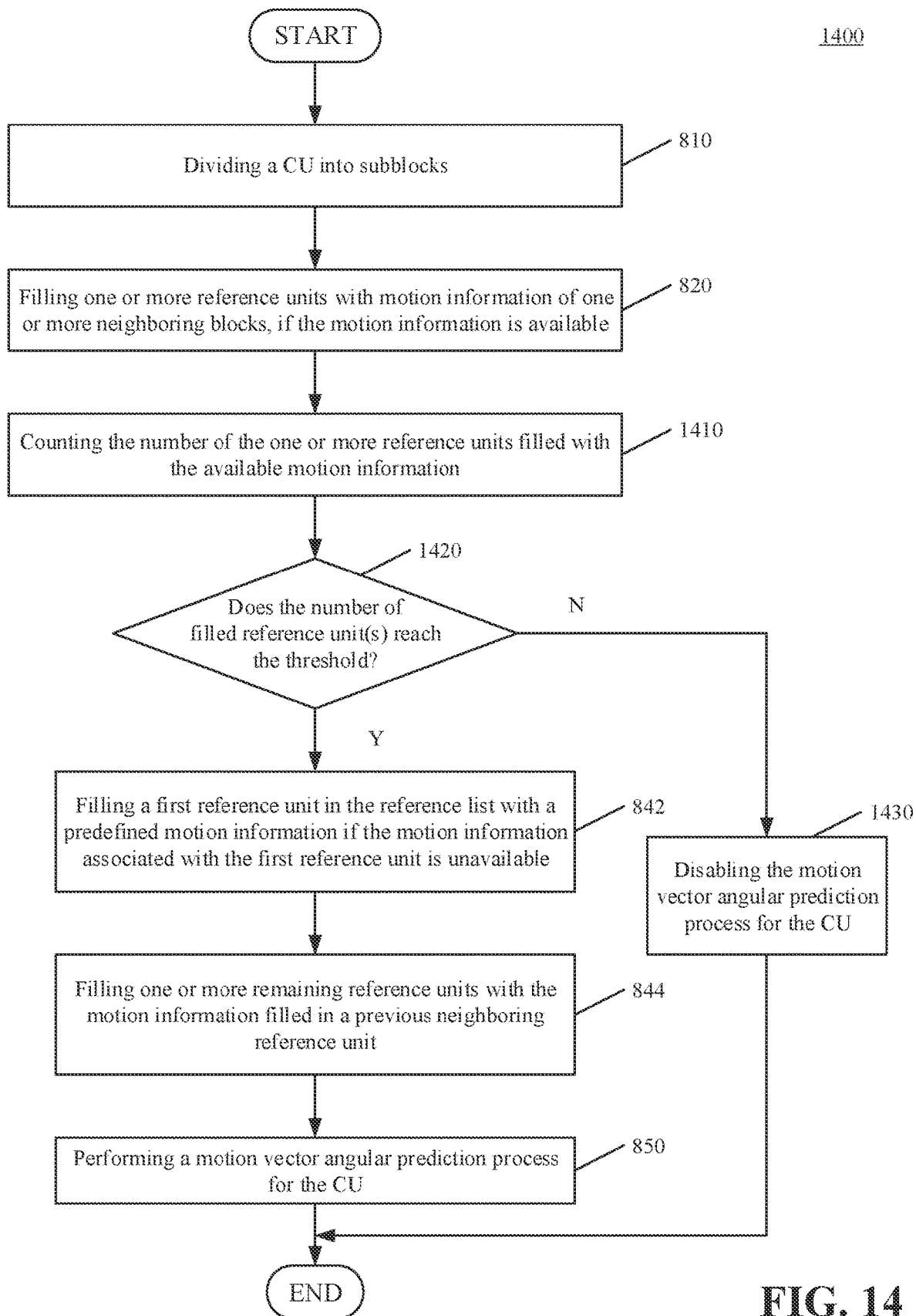
FIG. 14 illustrates a flowchart of yet another exemplary MVAP process, consistent with some embodiments of the present disclosure.

FIG. 14 illustrates a flowchart of another exemplary MVAP process 1400, consistent with some embodiments of the present disclosure. Compared to MVAP process 800 in FIG. 8 or MVAP process 1300 in FIG. 13, in MVAP process 1400, encoder 200 or decoder 300 may perform steps 1410-1430 after the available motion information is filled in step 820.

At step 1410, encoder 200 or decoder 300 counts the number of the reference unit(s) filled with the available motion information. At step 1420, encoder 200 or decoder 300 determines whether the number of reference unit(s) filled with the available motion information reaches a predefined threshold value or percentage (e.g., 25% or 50% of the total number).

In response to the number of the reference units filled with the available motion information reaching the threshold value (step 1420—yes), encoder 200 or decoder 300 enables the motion vector angular prediction process for the coding unit, and continues to perform steps 842, 844, and 850. Accordingly, encoder 200 or decoder 300 can derive a candidate list storing motion candidates including five MVAP candidates (e.g., MVAP candidates shown in FIGS. 12A-12E) for each subblock according to five prediction directions D0-D4.

In response to the number of the reference units filled with the available motion information being less than the threshold value (step 1420—no), encoder 200 or decoder 300, at step 1430, disables the MVAP process for the current CU.

Accordingly, encoder 200 or decoder 300 derives the candidate list without storing MVAP candidate(s) in the candidate list.

In some embodiments, the motion information comparison performed in step 830 is complicated for hardware implementation. By eliminating the comparison step 830 in MVAP process 1300 in FIG. 13 or MVAP process 1400 in FIG. 14, the derivation of MVAP candidates can be simplified, which reduces the computation complexity and provides more efficient processing.

In MVAP process 1300 in FIG. 13, the steps of filling the reference motion information list can be simplified to steps 820, 842, and 844. In step 820, the available motion information is copied and filled to the reference units. In steps 842 and 844, remaining reference units due to the unavailable motion information can be filled by the predefined motion information or the motion information filled in the neighboring reference unit.

In MVAP process 1400 in FIG. 14, the MVAP process can be disabled and terminated if the available motion information in neighboring blocks is insufficient to predict accurate MVAP candidates. Accordingly, compared to MVAP process 1300 in FIG. 13, the coding efficiency can be improved with the slightly increased coding complexity.

In view of above, as proposed in various embodiments of the present disclosure, by encoding and decoding the bitstream in the skip mode or the direct mode using the simplified MVAP process, it is possible to enable or disable the MVAP process according to the size of the coding unit. Accordingly, the encoding and decoding complexity can be reduced. In addition, in some embodiments, by assigning a predefined motion information when the first entry in the reference list is unavailable, there is no need to search for the first available motion information of the reference list when filing the reference list. Accordingly, a simplified and hardware-friendly MVAP process can be achieved. Moreover, in some embodiments, the motion information comparison step in the MVAP process can be eliminated or replaced by simplified methods to further reduce the encoding and decoding complexity.

Various exemplary embodiments described herein are described in the general context of method steps or processes, which may be implemented in one aspect by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as exemplary only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The embodiments may further be described using the following clauses:

1. A method for decoding video, comprising:
   receiving a bitstream including a coding unit of a video frame, the coding unit being coded in a skip mode or a direct mode;
   determining whether the coding unit has a width greater than a threshold width or a height greater than a threshold height;
   in response to the coding unit having the width greater than the threshold width or the height greater than the threshold height, enabling a motion vector angular prediction process to store one or more motion vector angular prediction candidates in a candidate list storing a plurality of motion candidates associated with the coding unit; and performing an inter prediction to the coding unit according to the candidate list and an index parsed from the bitstream.

2. The method of clause 1, further comprising:

in response to another coding unit having a width equal to the threshold width and a height equal to the threshold height, disabling the motion vector angular prediction process to derive the candidate list storing the plurality of motion candidates associated with the another coding unit without storing any motion vector angular prediction candidate in the candidate list.

3. The method of clause 1 or clause 2, further comprising:

deriving the candidate list for the inter prediction by:
storing a temporal motion vector predictor as one of the motion candidates in the candidate list;
storing a spatial motion vector predictor as one of the motion candidates in the candidate list; and
in response to the motion vector angular prediction process being enable, storing the one or more motion vector angular prediction candidates as one or more of the motion candidates in the candidate list.

4. The method of clause 3, wherein deriving the candidate list further comprises:

checking whether a history-based motion vector predictor stored in a HMVP table is identical to any motion candidate in the candidate list; and in response to the history-based motion vector predictor being different from the motion candidates in the candidate list, storing the history-based motion vector predictor as one of the motion candidates in the candidate list.

5. A method for encoding video, comprising:

determining whether a coding unit of a video frame have a width greater than a threshold width or a height greater than a threshold height;

in response to the coding unit having the width greater than the threshold width or the height greater than the threshold height, enabling a motion vector angular prediction process to store one or more motion vector angular prediction candidates in a candidate list storing a plurality of motion candidates associated with the coding unit;

performing an inter prediction to the coding unit according to a selected motion candidate in the candidate list; and signaling a bitstream associated with the video frame, the bitstream including the one or more coding units coded in a skip mode or a direct mode and an index of the selected motion candidate.

6. The method of clause 5, further comprising:

in response to another coding unit having a width equal to the threshold width and a height equal to the threshold height, disabling the motion vector angular prediction process to derive the candidate list storing the plurality of motion candidates associated with the another coding unit without storing any motion vector angular prediction candidate in the candidate list.

7. The method of clause 5 or clause 6, further comprising:

deriving the candidate list for the inter prediction by:
storing a temporal motion vector predictor as one of the motion candidates in the candidate list;
storing a spatial motion vector predictor as one of the motion candidates in the candidate list; and
in response to the motion vector angular prediction process being enable, storing the one or more motion vector angular prediction candidates as one or more of the motion candidates in the candidate list.

8. The method of clause 7, wherein deriving the candidate list further comprises:

checking whether a history-based motion vector predictor stored in a HMVP table is identical to any motion candidate in the candidate list; and in response to the history-based motion vector predictor being different to the motion candidates in the candidate list, storing the history-based motion vector predictor as one of the motion candidates in the candidate list.

9. A method for motion vector prediction, comprising:

dividing a coding unit into a plurality of subblocks;

filling a reference list associated with the coding unit by:
filling a reference unit in the reference list with motion information of a neighboring block of the coding unit, if the motion information of the neighboring block associated with the reference unit is available;
filling a first reference unit being a first entry in the reference list with a predefined motion information if the motion information of a first neighboring block associated with the first reference unit is unavailable; and
filling a remaining reference unit with the motion information filled in a previous neighboring reference unit in the reference list if the motion information of the neighboring block associated with the remaining reference unit is unavailable; and performing a motion vector angular prediction process to obtain one or more motion vector angular prediction candidates for each subblock by using the reference list according to one or more prediction directions.

10. The method of clause 9, wherein filling the first reference unit with the predefined motion information comprises:

filling the first reference unit with a zero-motion vector and a reference index set to zero.

11. The method of clause 9, wherein filling the first reference unit with the predefined motion information comprises:

filling the first reference unit with the motion information stored in a last entry of a history-based motion vector predictor table.

12. The method of clause 9, wherein filling the first reference unit with the predefined motion information comprises:

filling the first reference unit with the motion information of a temporal motion vector predictor (TMVP) candidate or a spatial motion vector predictor (SMVP) candidate.

13. The method of any of clauses 9-12, further comprising:

in response to the number of the reference unit filled with the available motion information of the neighboring block being less than a threshold value:
disabling the motion vector angular prediction process for the coding unit; and
deriving a candidate list storing a plurality of motion candidates without storing any vector angular prediction candidate to the candidate list.

14. The method of any of clauses 9-12, further comprising:

in response to the number of the reference unit filled with the available motion information of the neighboring block reaching a threshold value:
  enabling the motion vector angular prediction process for the coding unit; and
  deriving a candidate list storing a plurality of motion candidates including a plurality of motion vector angular prediction candidates for each subblock according to a plurality of prediction directions.

15. The method of any of clauses 9-12, further comprising:
enabling the motion vector angular prediction process for the coding unit without checking for an availability of the one or more prediction directions; and
deriving a candidate list storing a plurality of motion candidates including a plurality of motion vector angular prediction candidates for each subblock according to a plurality of prediction directions.

16. The method of any of clauses 9-12, further comprising:
selecting one or more available directions from a plurality of prediction directions by checking for an availability of each prediction direction; and
performing the motion vector angular prediction process according to the one or more available directions to obtain the one or more motion vector angular prediction candidates.

17. The method of clause 16, wherein the number of the one or more vector angular prediction candidates is between 0 to 5 according to the number of the one or more available directions.

18. The method of any of clauses 9-17, wherein the number of the reference units in the reference motion information list is (2M/4+2N/4+1) for a M×N coding unit, M and N being integer.

19. The method of any of clauses 9-18, wherein the size of the reference unit in the reference motion information list is 4×4.

20. The method of any of clauses 9-19, further comprising:
deriving a candidate list storing a plurality of motion candidates by:
  storing a temporal motion vector predictor and a spatial motion vector predictor;
  in response to the motion vector angular prediction process being enable, storing the one or more motion vector angular prediction candidate; and
  storing a history-based motion vector predictor.

21. An apparatus, comprising:
a memory configured to store instructions; and
a processor coupled to the memory and configured to execute the instructions to cause the apparatus to:
  receive a bitstream including a coding unit of a video frame, the coding unit being coded in a skip mode or a direct mode;
  determine whether the coding unit has a width greater than a threshold width or a height greater than a threshold height;
  in response to the coding unit having the width greater than the threshold width or the height greater than the threshold height, enable a motion vector angular prediction process to store one or more motion vector angular prediction candidates in a candidate list storing a plurality of motion candidates associated with the coding unit; and
  perform an inter prediction to the coding unit according to the candidate list and an index parsed from the bitstream.

22. The apparatus of clause 21, wherein the processor is configured to execute the instructions to cause the apparatus to:
in response to another coding unit having a width equal to the threshold width and a height equal to the threshold height, disable the motion vector angular prediction process to derive the candidate list storing the plurality of motion candidates associated with the another coding unit without storing any motion vector angular prediction candidate in the candidate list.

23. The apparatus of clause 21 or clause 22, wherein the processor is configured to execute the instructions to cause the apparatus to:
derive the candidate list for the inter prediction by:
  storing a temporal motion vector predictor as one of the motion candidates in the candidate list;
  storing a spatial motion vector predictor as one of the motion candidates in the candidate list; and
  in response to the motion vector angular prediction process being enable, storing the one or more motion vector angular prediction candidates as one or more of the motion candidates in the candidate list.

24. The apparatus of clause 23, wherein the processor is configured to execute the instructions to cause the apparatus to derive the candidate list by:
checking whether a history-based motion vector predictor stored in a HMVP table is identical to any motion candidate in the candidate list; and
in response to the history-based motion vector predictor being different from the motion candidates in the candidate list, storing the history-based motion vector predictor as one of the motion candidates in the candidate list.

25. An apparatus, comprising:
a memory configured to store instructions; and
a processor coupled to the memory and configured to execute the instructions to cause the apparatus to:
  determine whether a coding unit of a video frame have a width greater than a threshold width or a height greater than a threshold height;
  in response to the coding unit having the width greater than the threshold width or the height greater than the threshold height, enable a motion vector angular prediction process to store one or more motion vector angular prediction candidates in a candidate list storing a plurality of motion candidates associated with the coding unit;
  perform an inter prediction to the coding unit according to a selected motion candidate in the candidate list; and
  signal a bitstream associated with the video frame, the bitstream including the one or more coding units coded in a skip mode or a direct mode and an index of the selected motion candidate.

26. The apparatus of clause 25, wherein the processor is configured to execute the instructions to cause the apparatus to:
in response to another coding unit having a width equal to the threshold width and a height equal to the threshold height, disable the motion vector angular prediction process to derive the candidate list storing the plurality of motion candidates associated with the another coding unit without storing any motion vector angular prediction candidate in the candidate list.

27. The apparatus of clause 25 or clause 26, wherein the processor is configured to execute the instructions to cause the apparatus to:
derive the candidate list for the inter prediction by:
storing a temporal motion vector predictor as one of the motion candidates in the candidate list;
storing a spatial motion vector predictor as one of the motion candidates in the candidate list; and
in response to the motion vector angular prediction process being enable, storing the one or more motion vector angular prediction candidates as one or more of the motion candidates in the candidate list.

28. The apparatus of clause 27, wherein the processor is configured to execute the instructions to cause the apparatus to derive the candidate list by:
checking whether a history-based motion vector predictor stored in a HMVP table is identical to any motion candidate in the candidate list; and
in response to the history-based motion vector predictor being different to the motion candidates in the candidate list, storing the history-based motion vector predictor as one of the motion candidates in the candidate list.

29. An apparatus, comprising:
a memory configured to store instructions; and
a processor coupled to the memory and configured to execute the instructions to cause the apparatus to:
divide a coding unit into a plurality of subblocks;
fill a reference list associated with the coding unit by:
filling a reference unit in the reference list with motion information of a neighboring block of the coding unit, if the motion information of the neighboring block associated with the reference unit is available;
filling a first reference unit being a first entry in the reference list with a predefined motion information if the motion information of a first neighboring block associated with the first reference unit is unavailable; and
filling a remaining reference unit with the motion information filled in a previous neighboring reference unit in the reference list if the motion information of the neighboring block associated with the remaining reference unit is unavailable; and
perform a motion vector angular prediction process to obtain one or more motion vector angular prediction candidates for each subblock by using the reference list according to one or more prediction directions.

30. The apparatus of clause 29, wherein the processor is configured to execute the instructions to cause the apparatus to fill the first reference unit with the predefined motion information by:
filling the first reference unit with a zero-motion vector and a reference index set to zero.

31. The apparatus of clause 29, wherein the processor is configured to execute the instructions to cause the apparatus to fill the first reference unit with the predefined motion information by:
filling the first reference unit with the motion information stored in a last entry of a history-based motion vector predictor table.

32. The apparatus of clause 29, wherein the processor is configured to execute the instructions to cause the apparatus to fill the first reference unit with the predefined motion information by:
filling the first reference unit with the motion information of a temporal motion vector predictor (TMVP) candidate or a spatial motion vector predictor (SMVP) candidate.

33. The apparatus of any of clauses 29-32, wherein the processor is configured to execute the instructions to cause the apparatus to:
in response to the number of the reference unit filled with the available motion information of the neighboring block being less than a threshold value:
disable the motion vector angular prediction process for the coding unit; and
derive a candidate list storing a plurality of motion candidates without storing any vector angular prediction candidate to the candidate list.

34. The apparatus of any of clauses 29-32, wherein the processor is configured to execute the instructions to cause the apparatus to:
in response to the number of the reference unit filled with the available motion information of the neighboring block reaching a threshold value:
enable the motion vector angular prediction process for the coding unit; and
derive a candidate list storing a plurality of motion candidates including a plurality of motion vector angular prediction candidates for each subblock according to a plurality of prediction directions.

35. The apparatus of any of clauses 29-32, wherein the processor is configured to execute the instructions to cause the apparatus to:
enable the motion vector angular prediction process for the coding unit without checking for an availability of the one or more prediction directions; and
deriving a candidate list storing a plurality of motion candidates including a plurality of motion vector angular prediction candidates for each subblock according to a plurality of prediction directions.

36. The apparatus of any of clauses 29-32, wherein the processor is configured to execute the instructions to cause the apparatus to:
select one or more available directions from a plurality of prediction directions by checking for an availability of each prediction direction; and
perform the motion vector angular prediction process according to the one or more available directions to obtain the one or more motion vector angular prediction candidates.

37. The apparatus of clause 36, wherein the number of the one or more vector angular prediction candidates is between 0 to 5 according to the number of the one or more available directions.

38. The apparatus of any of clauses 29-37, wherein the number of the reference units in the reference motion information list is (2M/4+2N/4+1) for a M×N coding unit, M and N being integer.

39. The apparatus of any of clauses 29-38, wherein the size of the reference unit in the reference motion information list is 4×4.

40. The apparatus of any of clauses 29-39, wherein the processor is configured to execute the instructions to cause the apparatus to:
derive a candidate list storing a plurality of motion candidates by:
storing a temporal motion vector predictor and a spatial motion vector predictor;

in response to the motion vector angular prediction
process being enable, storing the one or more motion
vector angular prediction candidate; and
storing a history-based motion vector predictor.
41. A non-transitory computer-readable storage medium
storing a set of instructions that are executable by one
or more processors of a device to cause the device to
perform a method for decoding video, comprising:
receiving a bitstream including a coding unit of a video
frame, the coding unit being coded in a skip mode or a
direct mode;
determining whether the coding unit has a width greater
than a threshold width or a height greater than a
threshold height;
in response to the coding unit having the width greater
than the threshold width or the height greater than the
threshold height, enabling a motion vector angular
prediction process to store one or more motion vector
angular prediction candidates in a candidate list storing
a plurality of motion candidates associated with the
coding unit; and
performing an inter prediction to the coding unit according to the candidate list and an index parsed from the
bitstream.
42. The non-transitory computer-readable storage
medium of clause 41, wherein the set of instructions
that are executable by the one or more processors of the
device causes the device to further perform:
in response to another coding unit having a width equal to
the threshold width and a height equal to the threshold
height, disabling the motion vector angular prediction
process to derive the candidate list storing the plurality
of motion candidates associated with the another coding unit without storing any motion vector angular
prediction candidate in the candidate list.
43. The non-transitory computer-readable storage
medium of clause 41 or clause 42, wherein the set of
instructions that are executable by the one or more
processors of the device causes the device to further
perform:
deriving the candidate list for the inter prediction by:
storing a temporal motion vector predictor as one of the
motion candidates in the candidate list;
storing a spatial motion vector predictor as one of the
motion candidates in the candidate list; and
in response to the motion vector angular prediction
process being enable, storing the one or more motion
vector angular prediction candidates as one or more
of the motion candidates in the candidate list.
44. The non-transitory computer-readable storage
medium of clause 43, wherein the set of instructions
that are executable by the one or more processors of the
device causes the device to further perform deriving the
candidate list by:
checking whether a history-based motion vector predictor
stored in a HMVP table is identical to any motion
candidate in the candidate list; and
in response to the history-based motion vector predictor
being different from the motion candidates in the
candidate list, storing the history-based motion vector
predictor as one of the motion candidates in the candidate list.
45. A non-transitory computer-readable storage medium
storing a set of instructions that are executable by one
or more processors of a device to cause the device to
perform a method for encoding video, comprising:

determining whether a coding unit of a video frame have
a width greater than a threshold width or a height
greater than a threshold height;
in response to the coding unit having the width greater
than the threshold width or the height greater than the
threshold height, enabling a motion vector angular
prediction process to store one or more motion vector
angular prediction candidates in a candidate list storing
a plurality of motion candidates associated with the
coding unit;
performing an inter prediction to the coding unit according to a selected motion candidate in the candidate list;
and
signaling a bitstream associated with the video frame, the
bitstream including the one or more coding units coded
in a skip mode or a direct mode and an index of the
selected motion candidate.
46. The non-transitory computer-readable storage
medium of clause 45, wherein the set of instructions
that are executable by the one or more processors of the
device causes the device to further perform:
in response to another coding unit having a width equal to
the threshold width and a height equal to the threshold
height, disabling the motion vector angular prediction
process to derive the candidate list storing the plurality
of motion candidates associated with the another coding unit without storing any motion vector angular
prediction candidate in the candidate list.
47. The non-transitory computer-readable storage
medium of clause 45 or clause 46, wherein the set of
instructions that are executable by the one or more
processors of the device causes the device to further
perform:
deriving the candidate list for the inter prediction by:
storing a temporal motion vector predictor as one of the
motion candidates in the candidate list;
storing a spatial motion vector predictor as one of the
motion candidates in the candidate list; and
in response to the motion vector angular prediction
process being enable, storing the one or more motion
vector angular prediction candidates as one or more
of the motion candidates in the candidate list.
48. The non-transitory computer-readable storage
medium of clause 47, wherein the set of instructions
that are executable by the one or more processors of the
device causes the device to further perform deriving the
candidate list by:
checking whether a history-based motion vector predictor
stored in a HMVP table is identical to any motion
candidate in the candidate list; and
in response to the history-based motion vector predictor
being different to the motion candidates in the candidate list, storing the history-based motion vector predictor as one of the motion candidates in the candidate
list.
49. A non-transitory computer-readable storage medium
storing a set of instructions that are executable by one
or more processors of a device to cause the device to
perform a method for motion vector prediction, comprising:
dividing a coding unit into a plurality of subblocks;
filling a reference list associated with the coding unit by:
filling a reference unit in the reference list with motion
information of a neighboring block of the coding
unit, if the motion information of the neighboring
block associated with the reference unit is available;

filling a first reference unit being a first entry in the reference list with a predefined motion information if the motion information of a first neighboring block associated with the first reference unit is unavailable; and filling a remaining reference unit with the motion information filled in a previous neighboring reference unit in the reference list if the motion information of the neighboring block associated with the remaining reference unit is unavailable; and performing a motion vector angular prediction process to obtain one or more motion vector angular prediction candidates for each subblock by using the reference list according to one or more prediction directions.

50. The non-transitory computer-readable storage medium of clause 49, wherein the set of instructions that are executable by the one or more processors of the device causes the device to fill the first reference unit with the predefined motion information by:

filling the first reference unit with a zero-motion vector and a reference index set to zero.

51. The non-transitory computer-readable storage medium of clause 49, wherein the set of instructions that are executable by the one or more processors of the device causes the device to fill the first reference unit with the predefined motion information by:

filling the first reference unit with the motion information stored in a last entry of a history-based motion vector predictor table.

52. The non-transitory computer-readable storage medium of clause 49, wherein the set of instructions that are executable by the one or more processors of the device causes the device to fill the first reference unit with the predefined motion information by:

filling the first reference unit with the motion information of a temporal motion vector predictor (TMVP) candidate or a spatial motion vector predictor (SMVP) candidate.

53. The non-transitory computer-readable storage medium of any of clauses 49-52, wherein the set of instructions that are executable by the one or more processors of the device causes the device to further perform:

in response to the number of the reference unit filled with the available motion information of the neighboring block being less than a threshold value:
  disabling the motion vector angular prediction process for the coding unit; and
  deriving a candidate list storing a plurality of motion candidates without storing any vector angular prediction candidate to the candidate list.

54. The non-transitory computer-readable storage medium of any of clauses 49-52, wherein the set of instructions that are executable by the one or more processors of the device causes the device to further perform:

in response to the number of the reference unit filled with the available motion information of the neighboring block reaching a threshold value:
  enabling the motion vector angular prediction process for the coding unit; and
  deriving a candidate list storing a plurality of motion candidates including a plurality of motion vector angular prediction candidates for each subblock according to a plurality of prediction directions.

55. The non-transitory computer-readable storage medium of any of clauses 49-52, wherein the set of instructions that are executable by the one or more processors of the device causes the device to further perform:

enabling the motion vector angular prediction process for the coding unit without checking for an availability of the one or more prediction directions; and deriving a candidate list storing a plurality of motion candidates including a plurality of motion vector angular prediction candidates for each subblock according to a plurality of prediction directions.

56. The non-transitory computer-readable storage medium of any of clauses 49-52, wherein the set of instructions that are executable by the one or more processors of the device causes the device to further perform:

selecting one or more available directions from a plurality of prediction directions by checking for an availability of each prediction direction; and performing the motion vector angular prediction process according to the one or more available directions to obtain the one or more motion vector angular prediction candidates.

57. The non-transitory computer-readable storage medium of clause 56, wherein the number of the one or more vector angular prediction candidates is between 0 to 5 according to the number of the one or more available directions.

58. The non-transitory computer-readable storage medium of any of clauses 49-57, wherein the number of the reference units in the reference motion information list is (2M/4+2N/4+1) for a M×N coding unit, M and N being integer.

59. The non-transitory computer-readable storage medium of any of clauses 49-58, wherein the size of the reference unit in the reference motion information list is 4×4.

60. The non-transitory computer-readable storage medium of any of clauses 49-59, wherein the set of instructions that are executable by the one or more processors of the device causes the device to further perform:

deriving a candidate list storing a plurality of motion candidates by:
  storing a temporal motion vector predictor and a spatial motion vector predictor;
  in response to the motion vector angular prediction process being enable, storing the one or more motion vector angular prediction candidate; and
  storing a history-based motion vector predictor.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method of encoding a video sequence into a bitstream, the method comprising:
  receiving a video sequence;
  encoding one or more pictures of the video sequence; and
  generating a bitstream,
  wherein the encoding comprises:
    dividing a coding unit into a plurality of subblocks;
    filling a reference list associated with the coding unit by:
      filling a reference unit in the reference list with motion information of a neighboring block of the coding unit, if the motion information of the neighboring block associated with the reference unit is available; or filling a first reference unit being a first entry in the reference list with a predefined motion information if the motion information of a first neighboring block associated with the first reference unit is unavailable; and performing a motion vector angular prediction process on the plurality of subblocks, to obtain one or more motion vector angular prediction candidates by using the reference list according to one or more prediction directions.

2. The method of claim 1, wherein the reference unit is a bottom-left unit of the coding unit.

3. The method of claim 1, wherein filling the first reference unit with the predefined motion information comprises:
filling the first reference unit with a zero-motion vector and a reference index set to zero.

4. The method of claim 1, wherein further comprising:
disabling the motion vector angular prediction process for coding units having sizes equal to or smaller than 8×8.

5. The method of claim 1, further comprising:
filling a remaining reference unit with the motion information filled in a previous neighboring reference unit in the reference list if the motion information of the neighboring block associated with the remaining reference unit is unavailable.

6. The method of claim 1, wherein filling the first reference unit with the predefined motion information comprises:
filling the first reference unit with the motion information stored in a last entry of a history-based motion vector predictor table.

7. The method of claim 1, wherein filling the first reference unit with the predefined motion information comprises:
filling the first reference unit with the motion information of a temporal motion vector predictor (TMVP) candidate or a spatial motion vector predictor (SMVP) candidate.

8. The method of claim 1, further comprising:
in response to a number of the reference unit filled with available motion information of the neighboring block being less than a threshold value:
disabling the motion vector angular prediction process for the coding unit; and
deriving a candidate list storing a plurality of motion candidates without storing any vector angular prediction candidate to the candidate list.

9. The method of claim 1, further comprising:
in response to a number of the reference unit filled with available motion information of the neighboring block reaching a threshold value:
enabling the motion vector angular prediction process for the coding unit; and
deriving a candidate list storing a plurality of motion candidates including a plurality of motion vector angular prediction candidates for each subblock according to a plurality of prediction directions.

10. The method of claim 1, further comprising:
enabling the motion vector angular prediction process for the coding unit without checking for an availability of the one or more prediction directions; and
deriving a candidate list storing a plurality of motion candidates including a plurality of motion vector angular prediction candidates for each subblock according to a plurality of prediction directions.

11. The method of claim 1, further comprising:
selecting one or more available directions from a plurality of prediction directions by checking for an availability of each prediction direction; and
performing the motion vector angular prediction process according to the one or more available directions to obtain the one or more motion vector angular prediction candidates.

12. The method of claim 11, wherein a number of the one or more motion vector angular prediction candidates is between 0 to 5 according to the number of the one or more available directions.

13. The method of claim 1, wherein a number of reference units in the reference list is (2M/4+2N/4+1) for a M×N coding unit, M and N being integer.

14. The method of claim 1, wherein a size of the reference unit in the reference list is 4×4.

15. The method of claim 1, further comprising:
deriving a candidate list storing a plurality of motion candidates by:
storing a temporal motion vector predictor and a spatial motion vector predictor;
in response to the motion vector angular prediction process being enable, storing the one or more motion vector angular prediction candidates; and
storing a history-based motion vector predictor.

16. A video encoding apparatus, comprising:
a memory storing a set of instructions; and
one or more processors configured to execute the set of instructions to cause the apparatus to perform operations comprising:
dividing a coding unit into a plurality of subblocks;
filling a reference list associated with the coding unit by:
filling a reference unit in the reference list with motion information of a neighboring block of the coding unit, if the motion information of the neighboring block associated with the reference unit is available; and
filling a first reference unit being a first entry in the reference list with a predefined motion information if the motion information of a first neighboring block associated with the first reference unit is unavailable;
performing a motion vector angular prediction process on the plurality of subblocks, to obtain one or more motion vector angular prediction candidates by using the reference list according to one or more prediction directions; and
encoding, in a bitstream, indexes associated with the one or more motion vector angular prediction candidates.

17. The apparatus of claim 16, wherein the reference unit is a bottom-left unit of the coding unit.

18. The apparatus of claim 16, wherein in filling the first reference unit with the predefined motion information, the one or more processors are configured to execute the set of instructions to cause the apparatus to perform:
filling the first reference unit with a zero-motion vector and a reference index set to zero.

19. A non-transitory computer-readable storage medium storing a bitstream associated with a video sequence, wherein the bitstream comprises:
a candidate list comprising information identifying one or more motion vector angular prediction candidates associated with a coding unit, wherein the one or more motion vector angular prediction candidates are generated using operations comprising:
dividing the coding unit into a plurality of subblocks;
filling a reference list associated with the coding unit by:
filling a reference unit in the reference list with motion information of a neighboring block of the coding unit, if the motion information of the neighboring block associated with the reference unit is available; and
filling a first reference unit being a first entry in the reference list with a predefined motion information if the motion information of a first neighboring block associated with the first reference unit is unavailable; and
performing a motion vector angular prediction process on the plurality of subblocks, to obtain the one or more motion vector angular prediction candidates by using the reference list according to one or more prediction directions.

20. The non-transitory computer-readable storage medium of claim 19, wherein the reference unit is a bottom-left unit of the coding unit.

21. The non-transitory computer-readable storage medium of claim 19, wherein filling the first reference unit with the predefined motion information comprises:
filling the first reference unit with a zero-motion vector and a reference index set to zero.

22. The non-transitory computer-readable storage medium of claim 19, wherein the coding unit has a size greater than 8×8, and at least one of a height or a width of the coding unit is greater than 8.

* * * * *